US007970690B2

(12) United States Patent
Diana et al.

(10) Patent No.: US 7,970,690 B2
(45) Date of Patent: Jun. 28, 2011

(54) SYSTEM FOR IMPLEMENTING AUTOMATED OPEN MARKET AUCTIONING OF LEADS

(75) Inventors: Marc Diana, Santa Monica, CA (US); Per Pettersen, Los Angeles, CA (US)

(73) Assignee: LeadPoint, Inc., Santa Monica, CA (US)

( * ) Notice: Subject to any disclaimer, the term of this patent is extended or adjusted under 35 U.S.C. 154(b) by 956 days.

(21) Appl. No.: 11/207,571

(22) Filed: Aug. 19, 2005

(65) Prior Publication Data

US 2006/0041500 A1    Feb. 23, 2006

Related U.S. Application Data

(60) Provisional application No. 60/603,442, filed on Aug. 19, 2004, provisional application No. 60/610,470, filed on Sep. 15, 2004, provisional application No. 60/637,231, filed on Dec. 18, 2004, provisional application No. 60/674,868, filed on Apr. 25, 2005.

(51) Int. Cl.
*G06Q 40/00* (2006.01)
(52) U.S. Cl. ........................................... 705/37
(58) Field of Classification Search ........................ None
See application file for complete search history.

(56) References Cited

U.S. PATENT DOCUMENTS

| | | | |
|---|---|---|---|
| 4,757,267 A * | 7/1988 | Riskin | 379/114.24 |
| 4,774,664 A | 9/1988 | Campbell et al. | |
| 4,992,940 A | 2/1991 | Dworkin | |
| 5,218,539 A | 6/1993 | Elphick et al. | |
| 5,231,571 A | 7/1993 | D'Agostino | |
| 5,239,462 A | 8/1993 | Jones et al. | |
| 5,283,731 A * | 2/1994 | Lalonde et al. | 705/1.1 |
| 5,592,375 A | 1/1997 | Salmon et al. | |
| 5,611,052 A | 3/1997 | Dykstra et al. | |
| 5,664,115 A | 9/1997 | Fraser | |
| 5,671,279 A * | 9/1997 | Elgamal | 705/79 |
| 5,699,527 A | 12/1997 | Davidson | |
| 5,710,887 A | 1/1998 | Chelliah et al. | |
| 5,758,328 A | 5/1998 | Giovannoli | |
| 5,774,882 A | 6/1998 | Keen et al. | |
| 5,774,883 A | 6/1998 | Andersen et al. | |
| 5,794,207 A | 8/1998 | Walker et al. | |

(Continued)

FOREIGN PATENT DOCUMENTS

EP    0 840 244 A1    5/1998

OTHER PUBLICATIONS

Info Now Launches Version 5.0 of Enterprise Channel Management Software; PR Newswire Feb. 19, 2002, 3 pages.*

(Continued)

*Primary Examiner* — Alexander Kalinowski
*Assistant Examiner* — Bruce I Ebersman
(74) *Attorney, Agent, or Firm* — Haynes & Boone, LLP.

(57) ABSTRACT

In an automated leads-and-bids exchange system, bid profiles are defined to describe desires of lead buyers. Received leads are matched to active ones of the bid profiles whose specifications the leads substantially match. An auctioning subsystem finds the highest one or group of bids for each given lead. A quality rating database rates the quality of leads provided by different sellers. A price discounting engine discounts the amount paid to sellers who are rated as inferior sources of leads.

6 Claims, 7 Drawing Sheets

U.S. PATENT DOCUMENTS

| | | | |
|---|---|---|---|
| 5,794,219 A | 8/1998 | Brown | |
| 5,797,133 A | 8/1998 | Jones et al. | |
| 5,842,178 A | 11/1998 | Giovannoli | |
| 5,870,721 A | 2/1999 | Norris | |
| 5,875,437 A | 2/1999 | Atkins | |
| 5,878,403 A | 3/1999 | DeFrancesco et al. | |
| 5,913,202 A | 6/1999 | Motoyama | |
| 5,930,764 A | 7/1999 | Melchione et al. | |
| 5,937,391 A | 8/1999 | Ikeda et al. | |
| 5,940,807 A | 8/1999 | Purcell | |
| 5,940,811 A | 8/1999 | Norris | |
| 5,940,812 A | 8/1999 | Tengel et al. | |
| 5,946,665 A * | 8/1999 | Suzuki et al. | 705/26.62 |
| 5,966,699 A | 10/1999 | Zandi | |
| 5,966,700 A | 10/1999 | Gould et al. | |
| 5,970,472 A | 10/1999 | Allsop et al. | |
| 5,974,119 A | 10/1999 | Utsumi | |
| 5,974,406 A | 10/1999 | Bisdikian et al. | |
| 5,987,434 A | 11/1999 | Libman | |
| 5,987,440 A | 11/1999 | O'Neil et al. | |
| 5,987,500 A | 11/1999 | Arunachalam | |
| 5,995,947 A | 11/1999 | Fraser et al. | |
| 6,014,645 A | 1/2000 | Cunningham | |
| 6,041,308 A | 3/2000 | Walker et al. | |
| 6,058,379 A | 5/2000 | Odom et al. | |
| 6,067,525 A | 5/2000 | Johnson et al. | |
| 6,073,129 A | 6/2000 | Levine et al. | |
| 6,076,072 A | 6/2000 | Libman | |
| 6,085,169 A | 7/2000 | Walker et al. | |
| 6,088,686 A | 7/2000 | Walker et al. | |
| 6,105,007 A | 8/2000 | Norris | |
| 6,108,639 A | 8/2000 | Walker et al. | |
| 6,112,190 A | 8/2000 | Fletcher et al. | |
| 6,134,534 A | 10/2000 | Walker et al. | |
| 6,202,054 B1 | 3/2001 | Lawlor et al. | |
| 6,226,623 B1 | 5/2001 | Schein et al. | |
| 6,236,972 B1 | 5/2001 | Shkedy | |
| 6,236,977 B1 | 5/2001 | Verba et al. | |
| 6,243,691 B1 | 6/2001 | Fisher et al. | |
| 6,260,024 B1 | 7/2001 | Shkedy | |
| 6,282,517 B1 * | 8/2001 | Wolfe et al. | 705/36 R |
| 6,289,319 B1 | 9/2001 | Lockwood | |
| 6,311,178 B1 | 10/2001 | Bi et al. | |
| 6,332,129 B1 | 12/2001 | Walker et al. | |
| 6,341,270 B1 | 1/2002 | Esposito et al. | |
| 6,356,878 B1 | 3/2002 | Walker et al. | |
| 6,385,594 B1 | 5/2002 | Lebda et al. | |
| 6,513,013 B1 | 1/2003 | Stephanou | |
| 6,546,374 B1 | 4/2003 | Esposito et al. | |
| 6,587,838 B1 | 7/2003 | Esposito et al. | |
| 6,603,487 B1 | 8/2003 | Bennett et al. | |
| 6,611,816 B2 | 8/2003 | Lebda et al. | |
| 6,669,832 B1 | 12/2003 | Saito et al. | |
| 6,684,189 B1 | 1/2004 | Ryan et al. | |
| 6,868,389 B1 * | 3/2005 | Wilkins et al. | 705/10 |
| 7,010,508 B1 | 3/2006 | Lockwood | |
| 7,023,979 B1 * | 4/2006 | Wu et al. | 379/265.11 |
| 7,035,699 B1 * | 4/2006 | Anderson et al. | 700/90 |
| 7,047,206 B1 * | 5/2006 | Schultze | 705/10 |
| 7,068,643 B1 * | 6/2006 | Hammond | 370/352 |
| 7,133,835 B1 | 11/2006 | Fusz et al. | |
| 7,181,427 B1 | 2/2007 | DeFrancesco et al. | |
| 7,216,102 B2 * | 5/2007 | Nabe | 705/37 |
| 7,310,617 B1 | 12/2007 | Cunningham | |
| 7,340,411 B2 * | 3/2008 | Cook | 705/10 |
| 7,373,325 B1 * | 5/2008 | Hadingham et al. | 705/37 |
| 7,386,508 B1 | 6/2008 | Walker et al. | |
| 7,546,268 B1 * | 6/2009 | DiGiovanni et al. | 705/37 |
| 7,676,034 B1 * | 3/2010 | Wu et al. | 379/265.01 |
| 2001/0049648 A1 * | 12/2001 | Naylor et al. | 705/37 |
| 2002/0035537 A1 | 3/2002 | Waller et al. | |
| 2002/0072954 A1 | 6/2002 | Sales | |
| 2002/0103715 A1 | 8/2002 | Bennett et al. | |
| 2002/0120554 A1 * | 8/2002 | Vega | 705/37 |
| 2002/0178077 A1 * | 11/2002 | Katz et al. | 705/26 |
| 2002/0188689 A1 * | 12/2002 | Michael | 709/206 |
| 2003/0154120 A1 * | 8/2003 | Freishtat et al. | 705/9 |
| 2003/0225682 A1 * | 12/2003 | Montemer | 705/37 |
| 2004/0103041 A1 | 5/2004 | Alston | |
| 2004/0230438 A1 * | 11/2004 | Pasquale et al. | 705/1 |
| 2005/0125334 A1 | 6/2005 | Masella et al. | |
| 2005/0144052 A1 | 6/2005 | Harding et al. | |
| 2005/0147228 A1 | 7/2005 | Perrella et al. | |
| 2005/0149397 A1 | 7/2005 | Morgenstern et al. | |
| 2005/0234798 A1 | 10/2005 | Du Preez et al. | |
| 2006/0080229 A1 * | 4/2006 | Masella et al. | 705/38 |

OTHER PUBLICATIONS

H Launches Partnership with DDB RApp Digital, LB Works Ogilvy One; PR Newswire, Jun. 27, 2002, 2 Pages.*
Witness Systems Launches Japanese Version of eQuality Software, Businesswire, p. 2234, Apr. 24, 2002, 3 pages.*
International Search Report, PCT/US07/05795, mailing date Aug. 25, 2008.
Written Opinion of the International Searching Authority, PCT/US07/05795.
European Search Report for corresponding European application EP 05 78 8671 dated Sep. 21, 2009.
Free New Tools Designed to Help Carpoint-Affiliated Dealers Respond as Quickly as Possible to Customer Inquiries, Oct. 20, 1998, Microsoft.com, 1 page, Redmond, Washington.
Microsoft Licenses DealerPoint Technology to Help Honda and Acura Dealers Manage Internet Sales, Sep. 20, 1999, Microsoft.com, 1 page, San Francisco, California.
Auto-By-Tel advertisement, 1996, 3 Pages, Auto-By-Tel Corporation, Irvine, California.
A Better Way to Handle Your Insurance Needs advertisement, Feb. 20, 2008, 1 page.
AutoWeb Interactive advertisement.
1997 BMW 3 Series M3 Price Quote, 1997 Ford Ranger SuperCab XLT 4×4 125WB Price Quote, CarPoint, 1997 Honda Accord Price Quote, 3 pages.
1997 Ford Ranger SuperCab XLT 4×4 125WB Price Quote.
"AutoWeb Interactive wins the PC Magazine Top 100 Web Sites award for the SECOND time!", 1 page, Apr. 18, 1997.
Press Releases, InsWeb Announces inclusion in Microsoft Money 99 Financial Suite, Aug. 10, 1998, 1 page, San Mateo, California.
Press Releases, 1 Million Consumers Use InsWeb in First Half of 199, Aug. 5, 1998, 1 page, San Mateo, California.
Press Releases, Infoseek Launches Auto Insurance Center Powered By InsWeb, Sep. 15, 1998, 1 page, San Mateo, California.
Press Releases, InsWeb PR articles.
Steffen, Don, "Probable Tax Changes", Jun. 27, 1997, Weekly Update Tax News and Analysis, San Francisco, California.
WayBackMachine article http://www.insweb.com, 1 page.
Kane, Margaret, "Microsoft auto software hits exit ramp", CNET News.com, Jan. 22, 2003, 1 page.
Microsoft Delarpoint.Net Announces First International Deployment Of Its Lead Management System to Ford Dealers Across United Kingdom, Dec. 11, 2001, 1 page, Redmond, Washington.
Microsoft Licenses DealerPoint Technology to Help Honda and Acura Dealers Manage Internet Leads, Sep. 20, 1999, 1 page, San Francisco, California.
Cox, Beth, Microsoft Sells Off Dealerpoint, Real IT News, Jan. 22, 2003, 1 page.
Auto Channel list, 1 page.
Markoff, John, "A Web-Researched Ford in Microsoft's Future", The New York Times, Sep. 21, 1999, 1 page.
Bobulsky, Steve, "We Connect North American Automobile Dealers and Related Businesses to The Internet and The World Wide Web.", Webwise, www.webwheels.com, 1 page.
LendingTree, "Apply in Minutes, Know Within Hours.", 1999, www.lendinqtree.com 2 pages.
Paul, Lauren Gibbons, et al., "10 who dared to be different", PC Week, v14, n1, Jan. 6, 1997, p. 21(4).
"Retail Technology", Automative News, Jan. 12, 1998, 1 page.
Jiang, et al., "A Concept-Based Approach to Retrieval from an Electronic Industrial Directory", International Journal of Electronic Commerce, Fall 1996, vol. 1, No. 1, pp. 51-72.

Doorenbos, et al., "A Scalable Comparison-Shopping Agent for the World-Wide Web", Department of Computer Science and Engineering, University of Washington, 1997, 1 page.
Wildemuth, Scott, "A simple case of supply and demand", Datamation, v43, n11, p. 99(3), Nov. 1997, 1 page.
McClanahan, Robert H., "A System to Distribute Real-Time Operational Data Utilizing Existing Public Communications Infrastructure", Technical Information Systems, p. C6-1.
Andreasen, Louis, et al., "ADSI: The dawn of a new age of interactive services", Ottawa: Dec. 1993, Issue 97, pp. 34-51.
Rao, Srikumar S., "Are your customers being served", The H.W. Wilson Company, vol. 19, Sep. 16, 1997, 1 page.
Harris, Donna, "Internet sales cutting profits from financing, dealers say,", Automative News, v. 71, Issue 5730, Sep. 8, 1997, 1 page.
"Auto-By-Tel Wins With Educated Customers and Low Prices", Interactive Marketing News, vol. 3, Issue 28, Oct. 18, 1996, 1 page.
Autobytel.com Puts Representatives in the Field, Becoming First Online Buying Service to Localize Dealer Support Services, Sinocast, Nov. 5, 1998, 1 page, Irvine, California.
"Automotive Sites Missing Web Ad Opportunities", Electronic Marketplace Report, vol. 10, Issue 22, Nov. 19, 1996, 1 page.
Blumenstein, Rebecca, "On-line showroom Web site information helps buyers drive hard bargains, but car dealer profit, too,", Kansas City Star, Jan. 6, 1998, 1 page.
Embedded Systems Conference Spring advertisement, 1 page.
Conhaim, Wallys W., "Buying cars online.", Link-Up, vol. 15, Issue n5, Sep. 1, 1998, 1 page.
Industrial Distribution News, "GM buying into online auctions", Nov. 1998, http://www.inddist.com, 1 page.
Westlaw Delivery Summary Report for Taylor, David, Dec. 13, 2008, ALLNEWS database, 1 page.
Couretas, John, "Carpoint Web Site Adds Personal Touch: The Plan: Snag And Hold Surfers", Automative News, Nov. 9, 1998, 1 page.
Direct Marketing, "Trading Post Charges $10 for Limited Edition Catalog", Jul. 1983, 1 page.
Online—The Magazine of Online Information Systems, Nov./Dec. 1995, vol. 19—No. 6, 1 page.
S&MM Table of Contents—Jan. 14, 1985, 1 page.
Lee, Ho Geun, "Do electronic marketplaces lower the price of goods?", Communications of the ACM, vol. 41, n1, Jan. 1998, pp. 73-80.
Barua, Anitesh, et al,, "Efficient selection of suppliers over the Internet", Journal of Management Information Systems:JMIS, vol. 13, n4., Spring 1997, 1 page.
Online—The Magazine of Online Information Systems, Mar. 1994, vol. 18—No. 2, 1 page.
InformationWeek for Business and Technology Managers—Cover, 1 page.
Natalie Engler, "Emerging Enterprise—Online Opportunity", www.informationweek.com, Jan. 11, 1999, 1 page.
Schenecker, Mark, et al., "Goodbye to old-fashioned EDI", Informationweek, n713, pp. 73-88, Dec. 14, 1998, 1 page.
Microsoft CarPoint, Harvard Business School Article, Aug. 21, 2000, 1 page.
Carpoint in 1999, Harvard Business School Article, Oct. 6, 2000, 1 page.
Carpenter, Male, "How to play the bidding game", Money, Fall 1998, vol. 1, Iss. 2, pp. 70-71.
"Autoweb.com: Industry Leader Autoweb.com Revolutionizes Online Car Buying With Risk-Free Pricing Structure", Jan. 31, 1998, 1 page.
"Briefs", Journal of Commerce, Jan. 13, 1998, 1 page.
"Finet Expands with Knight Ridder.", Mortgage Marketplace, vol. 22, Issue 331, Jan. 4, 1999, 1 page.
"Lycos and AdOne's ClassifiedWarehouse.com Create Online Alliance; The Web's Most Comprehensive Classified Listings Come to Lycos.com", Business Wire, Dec. 2, 1998, p. 1093.
"Microsoft Unveils Carpoint Internet Car-Buying Service", PR Newswire, Jul. 17, 1996, 1 page, Redmond, Washington.
"Navidec Announces Wheels' Launches Progress Ahead of Schedule", PR Newswire, Oct. 27, 1997, 1 page, Denver, Colorado.
"Navidec Inc. Announces Third Quarter Results", PR Newswire, Nov. 6, 1997, 1 page, Denver, Colorado.

"Autoweb.com's New Risk-Free Pricing Structure Revolutionizes Online Car Buying Industry", PR Newswire, Feb. 9, 1998, 1 page, Santa Clara, California.
Burton, David, "Paging The Mercury Way", Business Equipment Digest, Jan. 1989, 1 page.
Neuwe, Ellwood I., "Personal Communication in Traditional Cellular Networks", Glenayre Electronics, vol. 2602, p. 184, Duluth, Georgia.
Cooke, James Aaron, "Point, click, and shop.", Logistics Management, vol. 36, n2, p. 705(3), Feb. 1997.
"Net nightmares.", Chief Executive, Jan. 1, 1998, 1 page.
Cardwell, Annette, "CYBERSCENE; On-line auction sites are coming on strong", Boston Herald, Jan. 13, 1999, 1 page.
Rafter, Michelle V., "Auto-By-Tel Your On-line Auto Source", St. Louis Post-Dispatch, Aug. 21, 1996, 1 page.
"Retain advertising and catalogs.", Seybold Report on Publishing Systems, vol. 23, n16, May 10, 1994, p. 56(6).
Naughton, Keith, et al., "Revolution in the Showroom: Finally, consumers are in the driver's seat-and pushy dealers look like dinosaurs", Business Week, No. 3463, Feb. 19, 1996, p. 70.
Stevens, Tim, "Set sale on the 'Net.", Industry Week, vol. 246, n8, Apr. 21, 1997, p. 56(7).
Henry, Ed, "The Virtual Car Buyer", Sending: On-Line Finances, Sep. 1995, 1 page.
Nauman, Matt, et al., "The Virtual Showroom Car Shopping on the Web", San Jose Mercury News, Feb. 7, 1997, 1 page.
Marketing Communications Contents, vol. 14, No. 5, May 1989, 1 page.
Choudhury, Vivek, et al., "Uses and consequences of electronic markets: An empirical investigation in the aircraft parts industry", MIS Quarterly, vol. 22, n4, Dec. 1998, pp. 471-507.
"Want to buy a new car?" Dec. 14, 1998, 1 page.
"What car? TV Limited: What car? Online and What car? Text boost manufacturer and dealer sales leads", M2 Presswire, Aug. 31, 1998, 1 page.
Little, Thomas, "Commerce on the Internet", IEEE Multimedia, 1994, 1 page.
Wiley, John & Sons, "The Extended Sales Enterprise: The Next Generation of Customer Management Automation", Khandpur & Wavers, 1998, 1 page.
"Sales Team Application", Integrated Sales & Marketing, 1996, 1 page.
AutoWeb.com, AutoWeb Interactive, On or before Jan. 13, 1998, 1 page.
Walker, Larry, "Adapting to a Consumer-Driven Marketplace", pp. 34-37, Housing Finance International.
Cocheo, Steve, "Automated underwriting: Tower of techno-Babel?", Sep. 1995, pp. 68, 72, 74, 104, First of a Series—Mortgage Lending, ABA Banking Journal.
"Chase Manhattan Mortgage Corporation Teams With Intuit As A Charter Lender for QuickenMortgage", Oct. 14, 1997, 1 page, Mountain View, California.
Trademark Search of CREDITSOURCE USA mark.
"Intuit Launches QuickenMortgage on theInternet", Nov. 4, 1997, 2 pages, Mountain View, California.
"Intuit's QuickenMortgage 2.0 Offers Online Applications & Five New Lenders", Mar. 11, 1998, 2 pages, Mountain View, California.
Cohen, Jackie, "To Mall or Not to Mall", May 1, 1998, 7 pages, vol. 11, No. 5, Bank Technology News.
Lending Tree, LLC history, pp. 293-296, vol. 93, International Directory of Company Histories.
Leong, S.K., et al., "An Internet application for on-line banking", Jul. 18, 1997, pp. 1534-1540, Computer Communications 20.
Guttentag, Jack, et al., "Point-of-Sale Mortgage Technology", pp. 3-12, Housing Finance International.
"QuickenMortgage, One of the Most Popular Mortgage Web Sites, Celebrates One Year Anniversary", Nov. 5, 1998, 2 pages, Mountain View, California.
Megboluge, Isaac F., "Residential Real Estate in the Age of Information Technology", Dec. 1997, pp. 1-6, Housing Finance International.
Cocheo, Steve, "Scoring gains ground while the Web waits", Jan. 1997, p. 52, vol. 89, No. 1.

Malone, Thomas, W., "What is Coordination Theory", Feb. 19, 1988, pp. 1-29, Massachusetts Institute of Technology, Cambridge, MassachusettsS.

"The Mortgage Loan Page-tm, Free Mortgage Broker Search Engine", 2 pages, May 8, 1996, COMCITY-News & Press Release, Fremont, California.

Williamson, A.G., "Refining a neural network credit application vetting system with a genetic algorithm", 1995, pp. 261-277, vol. 18, Journal of Microcomputer Applications, United Kingdom.

Morgan-Baldwin, Amelia A., et al., "Strategy and Impacts of Expert Systems for Bank Lending", 1996, pp. 455-461, vol. 11, No. 4, Expert Systems With Applications.

"Auto-By-Tel: The Premiere Auto Buying Service on the Internet", Feb. 5, 1998, 1 page, http://replay.waybackmachine.org/19980205084049/http://autobytel.com/about/index.cfm?id=abt.

WayBackMachine internet page regarding Mortgages, Apr. 24, 1998, 1 page, http://replay.waybackmachine.org/19980425195033/http://loan age.com/.

InsWeb, "A Better Way to Handle Your Insurance Needs", Apr. 11, 192011, 1 page, http://replay.waybackmachine.org/19980213062755/http://www1.insweb.com/.

LoanWeb.com information page, Apr. 25, 1998, 1 page, http://replay.waybackmachine.org/19980425195926/http://loanweb.com/.

WayBackMachine Internet page regarding GetSmart, Feb. 13, 1998, 1 page, http://replay.waybackrnachine.org/19980213053619/http://www1.getsmart.com/.

E-LOAN Internet page, 1997 1 page, Palo Alto, California, http://replay.waybackmachine.org/19980127150039/http://eloan.com/.

4freequotes.com's National Insurance Directory homepage, Apr. 22, 1998, 1 page, http://replay.waybackmachine.org/19980422084203/http://www.4freequotes.com/.

WayBackMachine directory page, May 22, 1998, 1 page, http://replay.waybackmachine.org/19980522084055/http://credit.com/.

WayBackMachine directory page, Dec. 12, 1998, 1 page, http://replay.waybackmachine.org/19981206025209/http://www.theloanpage.com/.

WayBackMachine loanlocator.com page, Apr. 2005, 2 pages, http://replay.waybackmachine.orq/19981212032218/http://www.rates.com/.

WayBackMachine—The Golden Credit Union homepage, Jun. 4, 1997, p. 1, http://replay.waybackmachine.org/19970604123321/http://www.golden1.com/.

WayBackMachine—Insuremarket, Your Online Insurance Resource, Jan. 15, 1998, 2 pages, http://replay.waybackmachine.org/19980115063409/http://www.insuremarket.com/.

WayBackMachine Mortgage homepage, Jan. 17, 1999, 1 page, http://replay.waybackmachine.org/19990117025241/http://www.chase.com:8009/noframes/mortgage-homepage.html.

WayBackMachine, "The key to smarter, easier borrowing", Jun. 29, 1997, 2 pages, http://replay.waybackmachine.org/19970629193656/http://www.citibank.com/us/borrowandloans/.

CMSI Products homepage, May 18, 1998, 2 pages, http://replay.waybackmachine.org/19980518225413/http://www.cmsinc.com/product.htm.

WayBackMachine, "Online Resources & Communications Corporation", Feb. 1997, 1 page, http://replay.waybackmachine.org/19980422144823/http://orcc.com/.

* cited by examiner

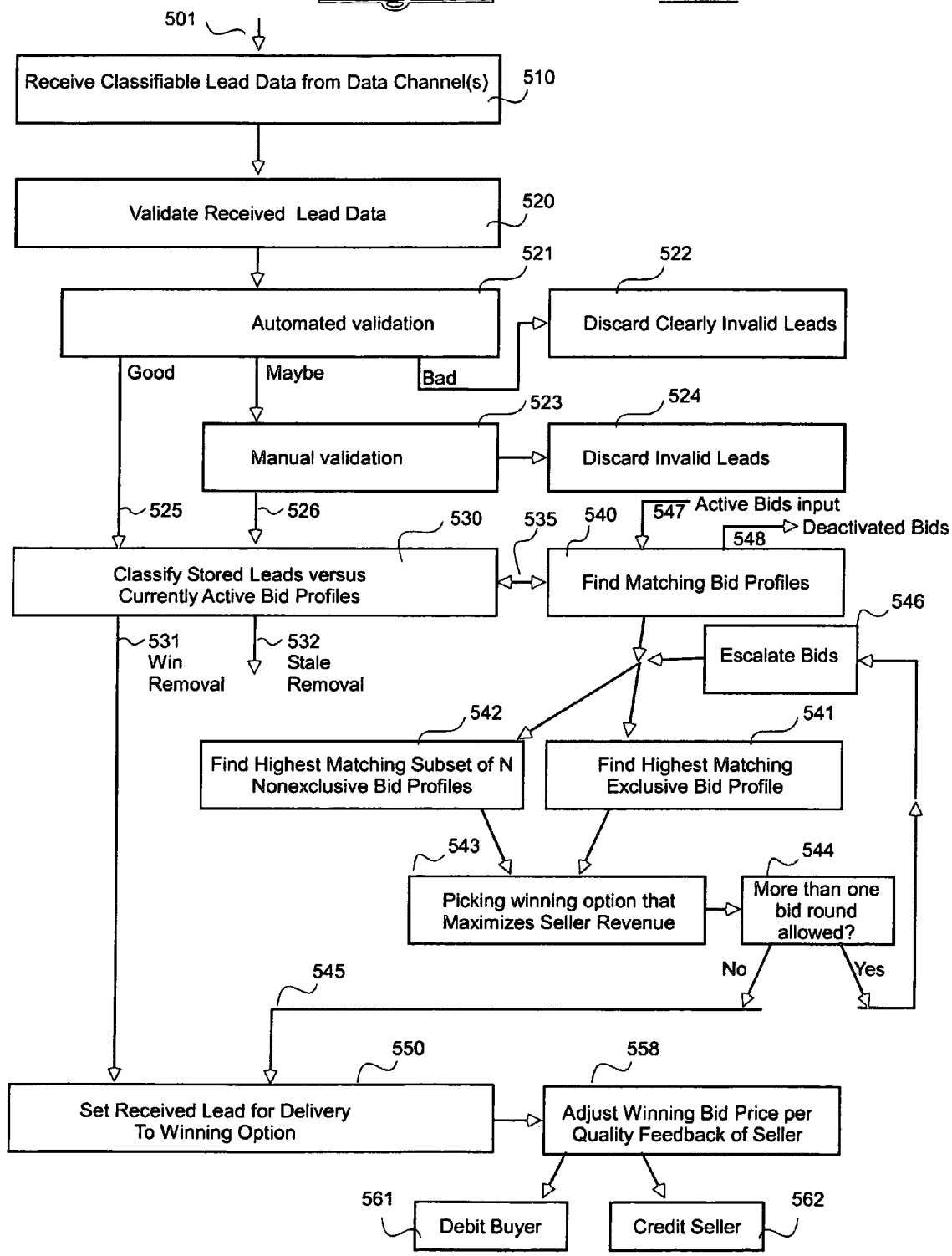

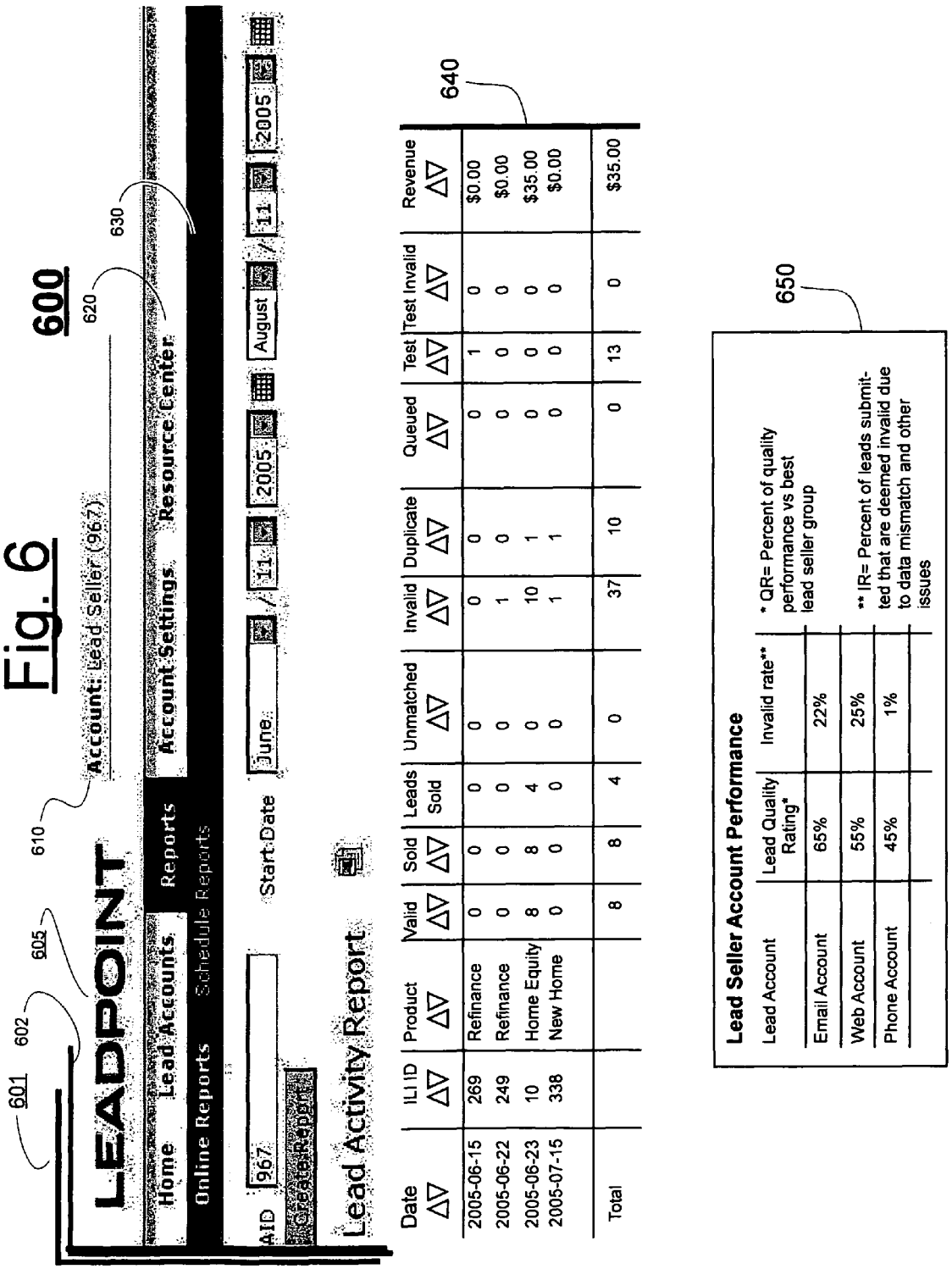

SYSTEM FOR IMPLEMENTING AUTOMATED OPEN MARKET AUCTIONING OF LEADS

FIELD OF DISCLOSURE

The invention relates generally to automated open-market pricing systems and more specifically to structures and methods for auctioning or bidding off leads when such leads are sourced from sellers to competing buyers of such leads.

CROSS REFERENCE TO CO-OWNED APPLICATIONS

The following copending U.S. patent applications are owned by the owner of the present application, and their disclosures are incorporated herein by reference:

(A) U.S. Provisional Application Ser. No. 60/603,442 filed Aug. 19, 2004 by Marc Diana and Per Pettersen and originally entitled, System and Method to Operate a Performance Priced Data Exchange Open Market Over the Internet;

(B) U.S. Provisional Application Ser. No. 60/610,470 filed Sep. 15, 2004 by Marc Diana and Per Pettersen and originally entitled, Keyword Search Returning Entry Form;

(C) U.S. Provisional Application Ser. No. 60/637,231 filed Dec. 18, 2004 by Marc Diana and Per Pettersen and originally entitled, Inbound Hot Lead Transfer Via Telephone; and (D) U.S. Provisional Application Ser. No. 60/674,868 filed Apr. 25, 2005 by Marc Diana and Per Pettersen and originally entitled, Inbound Hot Lead Transfer (Via Telephone).

DESCRIPTION OF RELATED ART

Speaking in broad terms, an astronomically large number of potential customers, clients or other consumers are available for buying or otherwise acquiring vendible goods and/or services. The pool of potential consumers may include all persons as well as public and private corporations, partnerships, governmental organizations and other such entities.

Vendible goods and/or services can span an equally large domain and may include anything from impulse purchase of items such as small candy bars to more methodically and rationally thought out acquisitions of financial instruments (e.g., home mortgages, loan refinancing packages) and/or of high-priced transportation vehicles (e.g., cars, trucks, airplanes etc.) and/or of high-priced other properties or services. The present disclosure is directed more so to the vending of high-end goods and/or services.

It should be apparent that a vendor of highly sophisticated goods and/or services (e.g., luxury automobiles with attached loan or leasing packages) will not want to waste time, energy and money reaching out to a person who is merely looking to acquire a candy bar in a far away local. Instead the high-end vendor would like to acquire a short list pointing to motivated prospective consumers who are financially and geographically pre-qualified and ready to soon close on a deal for the vendor's goods and/or services. This way, the vendor can direct his or her marketing energies on best prospects rather than wasting those energies on a more diffuse target audience.

A leads-providing industry has grown around the developing of short lists identifying optimally-ready and prospective consumers for various high-end goods and/or services. The industry may be vertically divided into a plurality of inter-linked layers including: (a) a leads generation layer, (b) a leads selling layer, (c) a leads buying layer, and (d) a leads exploitation or converting layer where, for the last layer, purchased leads are followed through on in hopes of converting the leads into consummated vendor-consumer transactions (i.e., purchases of vendor offered good and/or services).

Unless otherwise indicated, the term "lead" will be understood herein to refer to any mechanism by which a potential consumer having good current or future prospects for purchasing or otherwise consuming one or more goods and/or services is connected directly or indirectly to a vendor of such goods and/or services (or vise versa) such that the vendor can appeal directly or indirectly to the prospective consumer to purchase or otherwise consume one or more goods and/or services offered by the vendor. Leads may take many forms including but not limited to: (a) a live or on-hold telephone connection to a potentially interested consumer; (b) an ongoing Internet chat or other directed communication with a potentially interested consumer; and (c) one or more data sets that identify one or more potentially interested consumers and characteristics associated with their potential consumerism.

A variety of methods have been, and continue to be developed for originating leads and for conveying those leads up the vertically integrated leads market, from the originators to the ultimate purchasers and users of those leads, namely, the vendors (or vendor representatives) who wish to convert a large percentage of bought leads into actual consumer-vendor transactions.

Problems exist in the leads buying and selling marketplace. It has been difficult to create fair and efficient pricing mechanisms for leads. Often the process is very haphazard. Leads come in many flavors, qualities and potential values to the ultimate users of those leads. Each ultimate user may have a unique set of needs. The vendor of high-end end-of-season automobiles, for example, would have little use for a lead pointing to a potential customer who is interested only in buying a low-end automobile or low-end real estate property 6 months from now and who is completely uninterested in considering an immediate high-end acquisition. It would be a waste of time and energy for both the consumer and vendor to establish contacts with one another in hopes of possibly closing a deal. Nonetheless, there are unscrupulous bulk sellers of leads who are willing to sell mixtures of junk and good leads simply for the bulk profit and without regard for how the dispensing of even a few junk leads can hurt everyone in the industry. A few bad apples spoil the barrel, so to speak, because sellers of high quality leads have a hard time differentiating themselves from lower-priced purveyors of junk leads. Buyers of leads have a hard time identifying trustable sellers of leads. Buyers of leads find themselves often wasting time on junk leads that lead to dead ends or duplicative efforts. The buyers are wary of spending too much for a potentially burn lead. A haphazard and inefficient marketplace currently exists for the selling and buying of leads as well as moving them from seller to buyer.

SUMMARY

Structures and methods may be provided in accordance with the present disclosure of invention for improving over the above-described problems.

In accordance with one aspect of the present invention, buyer requisition profiles are created or specified by potential buyers of leads and stored in an automated leads-and-bids exchange system. Such profiles specify the types of leads the buyers are interested in. In one embodiment, each profile specifies one or more of: (a) a product, product type or range of products for which leads are sought by the corresponding buyer, where product can be one or more of various goods and/or services; (b) value or value range for the specified product(s); (c) location of the prospective consumer; (d) exclusivity or shared nature of the lead; (e) an opening bid amount for each matching lead; (f) product/consumer-specific other attributes of one or both of the product and prospective consumer; and (g) seller-specific attributes such as those describing the seller's history of providing leads within predefined conversion probability bands. In one embodiment, the other product/consumer-specific attributes include a credit rating range indicator for the prospective consumer. In one embodiment, the opening bid amount is accompanied by one or more escalating bid amounts which the buyer may wish to commit to if the profile loses in a first or subsequent round of biddings for matching leads. The escalating bid amounts reduce the probability that the bidder will win no leads while the initial bid amount may represent a bargain or discount price for a lead if no one else bids on it.

After buyer profiles are specified and stored, the leads-and-bids exchange system automatically classifies incoming leads according to how well they match with specifications in available and activated bidding profiles. The system allows for the carrying out of bidding wars (i.e., one shot bids or repeated auction rounds) between buyers who specify a same one or more of the incoming leads by way of their activated profiles. This in essence is a dynamic leads-classifying system because the buyer-specified profiles dynamically define the classes or match bins into which the incoming leads will flow for bidding upon those leads. In one embodiment, a highest bidding one of the active bidders in a given auction bin is awarded exclusive delivery of the profile-satisfying lead(s) that is/are presented for auction in that bin. In one embodiment, a limited subset of the bidders (i.e., no more than 4 bidders) is awarded shared delivery of each lead satisfying their respective profiles, where the members of the limited subset are automatically selected to maximize auction-generated revenue to the lead seller. In one embodiment, the auction system determines whether exclusive or shared awarding of a given, profile-matching lead will maximize revenue for the corresponding lead seller. The system picks the option which maximizes revenue flow to the seller and it thereby provides an efficient marketplace means by way of which, sellers of high-quality leads can have their offerings connected to one or a group of buyers for whom the leads offer highest value. Sellers win because they are able to match their offered leads with the desires (profiles) of the highest-paying one or more bidders (buyers) in the current market. Buyers win because they are able to find the best leads for their individualized needs without having to waste time, energy and/or money sifting through diffuse mountains of junk leads that have little or no value to the specific buyers.

In accordance with a second aspect of the invention, quality feedback means are provided for allowing buyers (successful bidders) to rate the quality of leads they purchased from various sellers. Leads may be categorized according to deal-closing rates (conversion rates) as well as quality of the prospective consumers they point to, if at all. (Sometimes a lead provides invalid contact data.) The system knows who the sellers are and who the buyers are but does not necessarily share that information with the opposed groups of sellers and buyers. Instead, the system assigns unique identifications to exchanged leads and bids and thus keeps private track of what lead was sold by which seller. The system's quality feedback mechanism allows the sellers of high quality leads (those that point to good prospects and have high closing probabilities; i.e. the prospect is a repeat customer) to become objectively differentiated from sellers of junk leads (those that point to invalid prospects and/or have poor closing rates). The quality feedback mechanism allows the high-end sellers to maximize the revenues they receive for their superior product. It allows buyers to objectively distinguish between sellers of quality and inferior leads. This is advantageous to both groups.

In accordance with a third aspect of the present disclosure, an automated price adjusting mechanism is provided whereby sellers of leads that are adjusted by the quality feedback means to be high-quality sellers can be given full or premium prices for their offerings. Conversely, the automated auction pricing mechanism urges or forces sellers of leads that are adjudged by the quality feedback means to be lower-quality sellers to accept discounted or marked down compensation for their offerings depending on how poorly their offerings are rated by actual buyers. In other words, quality-adjusted pricing is automatically provided in a transparent marketplace.

Other aspects of the disclosure will become apparent from the below detailed description.

BRIEF DESCRIPTION OF THE DRAWINGS

The below detailed description section makes reference to the accompanying drawings, in which:

FIG. 5 is a flow chart of a leads processing method in accordance with the invention; and FIG. 6 is shows an example of a quality and activity feedback data structure as may be used by a seller of leads to vendors who offer loan refinancing services.

DETAILED DESCRIPTION

Figure 1:
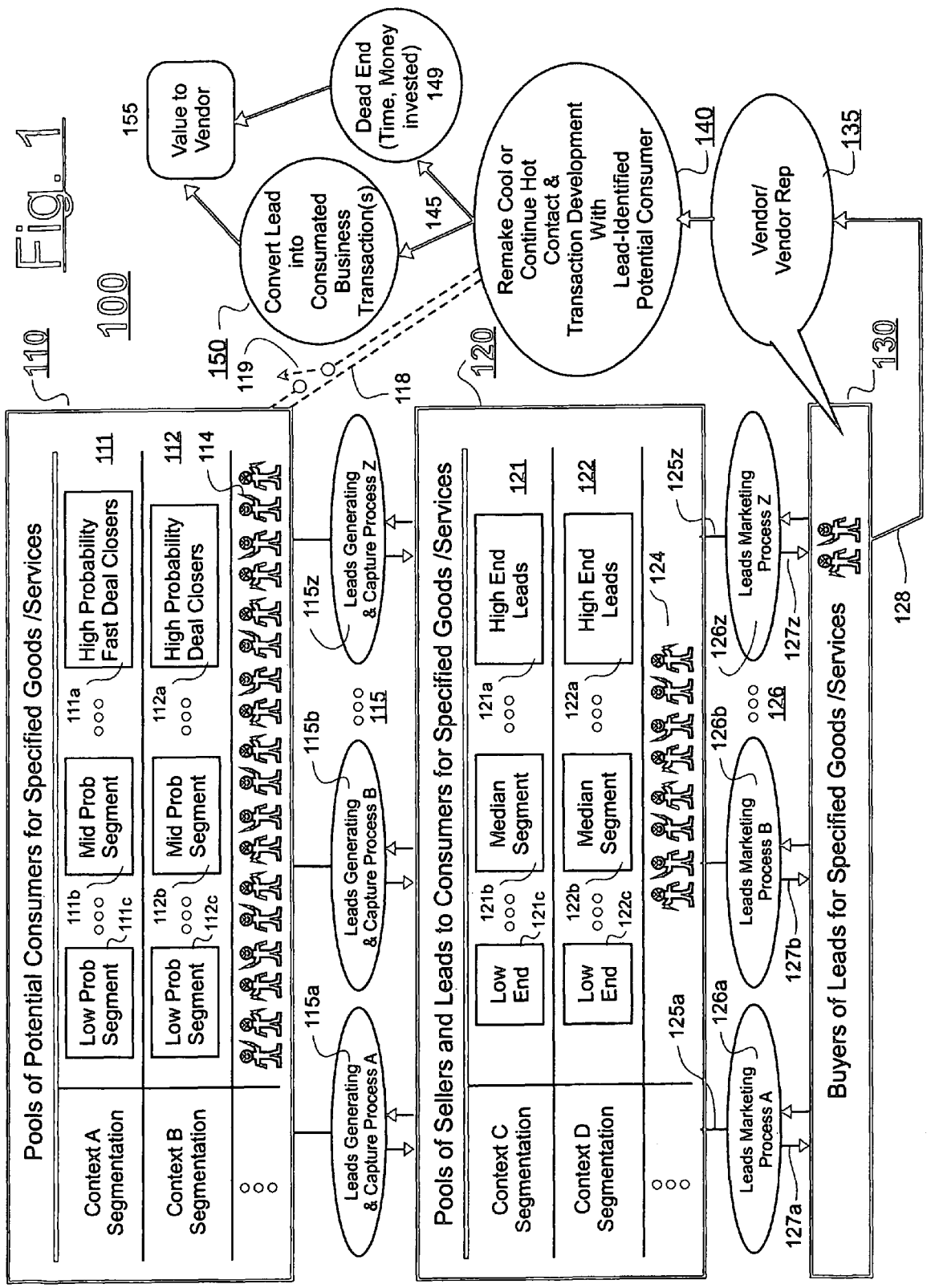
FIG. 1 is a block diagram of a vertically organized marketplace for generating leads, selling leads, buying leads and exploiting (converting) the purchased leads.

FIG. 1 is a block diagram of a vertically organized marketplace 100 which includes a leads generating layer 115, a leads selling and buying layer 126, a leads delivering layer 128, and a leads exploiting (converting) layer 140-150.

More specifically, a pool of all practically reachable consumers for each given good or service (the product) is represented at 110. This pool 110 may be segmented in any of a variety of ways depending on product, price range and/or other context setting parameters. The context-setting parameters may include, but are not limited to: (a) the associated class or range or mixture of products involved (e.g., automobile, loan refinance service, perishable fruits, etc.); (b) the price range of the product bundle; (c) the longevity of the lead, meaning how long the prospect for closing a deal remains viable (e.g., must be done within a day, a week, 3 months, a year, etc.); (d) the geographic location of the prospective consumer; (e) the financial well being of the prospective consumer (e.g., credit rating); (f) motivation of the prospective consumer to soon close the deal; and so forth.

Assume for example, that context A (111) is defined by a search for all prospective customers for a loan refinancing service (ReFi) in the loan range of $500,000 to $1 million dollars where the potential consumers satisfy certain pre-qualification criteria including an "excellent" pre-qualified credit rating. (The excellent credit rating indicates that the refinance application can pass bank scrutiny quickly and the deal can be closed quickly so that the refinance service vendor is paid in short time.) Under this first context, A (111), the total pool 110 of possible consumers may be segmented for example, to include a high-end segment 111a populated by very qualified potential consumers that have a comparatively high probability of closing on such a deal very quickly if connected with a corresponding vendor of refinancing services. A median, second segment 111b may be defined under first context A (111) as being populated by prospective consumers of moderately qualified potential that have a comparatively medium probability of closing on such a deal in say, 6 weeks or less. Finally a low-end, third segment 111c may be defined as being composed of unqualified potential consumers that have a comparatively low probability of timely closing on such a deal if contacted by a corresponding vendor. Naturally, most vendors want access to members of the high probability group 111a. But what are such vendors willing to pay for a lead to a possible member of group 111a? What if a lead points to a member of group 111b rather than 111a, has the vendor been cheated in buying a lead he thought pointed to a member of group 111a, and if so to what extent? Should the lead seller pay something back for having sold a somewhat defective lead? How can such a system be fairly administered?

Assume further, a second context, B (112) which is defined by a search for all prospective customers for a low priced automobile. The pool segmentation may then become entirely different as to which members of the reachable population 114 fit into the high-probability; fast deal closing segment 121a, the medium segment 121b or the poor-prospect segment 121c.

It is left to the ingenuity of lead originators to devise their own methods for generating leads, capturing leads and streaming them to potential buyers of such leads. The various lead generating processes are individually denoted as 115a, 115b, . . . , 115z; or collectively as 115. Certain lead originators may wish to keep their lead find and capture methods proprietary. Examples of origination methods may include, but are not limited to: (a) cold calling prospective consumers via a manual or automated call centers, (b) offering prizes via mass-transmitted emails, (c) operating prospect-attracting web sites such as portals, etc. that attract the desired kinds of persons to the site such that the visitor can then be directed to a site where the visitor is encouraged to fill out a lead generating form, and (d) culling through long lists provided by other lead generators so as to generate shorter and more reliable lists.

In layer 120, various members of the leads-selling group 124 have each acquired one or more leads which they now offer for sale to prospective lead buyers. The size of the leads selling population 124 is often much smaller than the size of the potential consumers class 114, but nonetheless the size of group 124 and their offerings can be sufficiently large to still pose a significant challenge to lead buyers 130. Lead buyers may wish to sift through various subpopulations of lead sellers and various subsets of each of their offered leads in order to determine which bundles of leads are probably worthwhile making a bid on and which are not, and for how much. The methods by which buyers find sellers (or vice versa) and negotiate prices for the offered leads are individually denoted as 126a, 126b, . . . , 126z; or collectively as 126.

It is at this procurement layer 126 that buyers and sellers run into problems. Some leads have very short life spans and need to be acted on quickly before they become stale (i.e., on-hold telephone leads). Some leads are long lived and the seller is in no immediate rush to quickly unload all of his or her offerings, especially if they are high quality ones. Heretofore, an efficient and reliable method is not known to have been available for allowing buyers to easily and quickly find sellers who are offering leads matching unique desires of such buyers. An efficient and reliable method is not known to have been available for allowing sellers to route their lead offerings to individual or groups of buyers who can make maximum use of offered leads and are thus willing to individually or collectively pay higher amounts for such leads.

Ignoring for a moment the problems of the leads buying and selling layer 126, the present description continues up the vertical market chain. Once a sale-of-lead is negotiated and closed on, the lead is delivered via pathway 128 to a product vendor 135 or an agent of that vendor. Full delay for lead delivery may be deemed to include the delay (e.g., 125z) for offering the lead after its capture (115z) as well as the delay for negotiating a price (e.g., 126z), the delay (e.g., 127z) for transferring the lead from seller to buyer and the delay for transferring 128 that bought lead from buyer 130 to vendor 135, if the latter two parties are not the same. In many cases, the vendor or vendor representative 135 is the last buyer in a chain of possibly multiple, buy and sell transactions for the given lead.

At step 140, the vendor who is in possession of the lead either continues hot contact (118) with a prospective consumer (114) that the lead generator has on hold on the phone or through another hot contact communications means; or the vendor reestablishes a less-then-hot contact (119) with the prospective consumer so as to attempt to convert the purchased lead 127a, 127b, . . . , 127z into a consummated business transaction (a selling of the vendor's product). Fork-in-the-road symbol 145 represents the fractions or percentages of leads that are successfully converted (150) versus those that become dead ends 149 for any of various reasons (i.e., failed to make contact, not interested, etc.). Dead end leads 149 represent loss of time and money expended in trying to convert the lead and therefore may be associated with a negative value to the vendor. Converted leads 150, on the other hand, often; but not always represent a net gain to the vendor, where the exact amount of gain may vary depending on the extent to which the lead had been developed before purchase and the amount of revenue realized from the consummated vendor-consumer transaction 150. The positive or negative outcomes (and percentage of occurrence) of possibilities 149 and 150 can be used to define the average value 155 of the purchased leads to the given vendor. Some leads are of relatively high value to the given vendor because they have a high probability of converting into a very lucrative transaction 150 for that given vendor 135. Others leads may be of much lower value because they have low probabilities of conversion and/or low pay offs even if converted. The vendor has to make that assessment on his or her own because a same lead may have different values to different vendors. One measure of lead value can be cost-per-close where the total spent on leads by a vendor is divided by the number of successful deal closures in a predefined time period (e.g., day, week or month).

Figure 2:
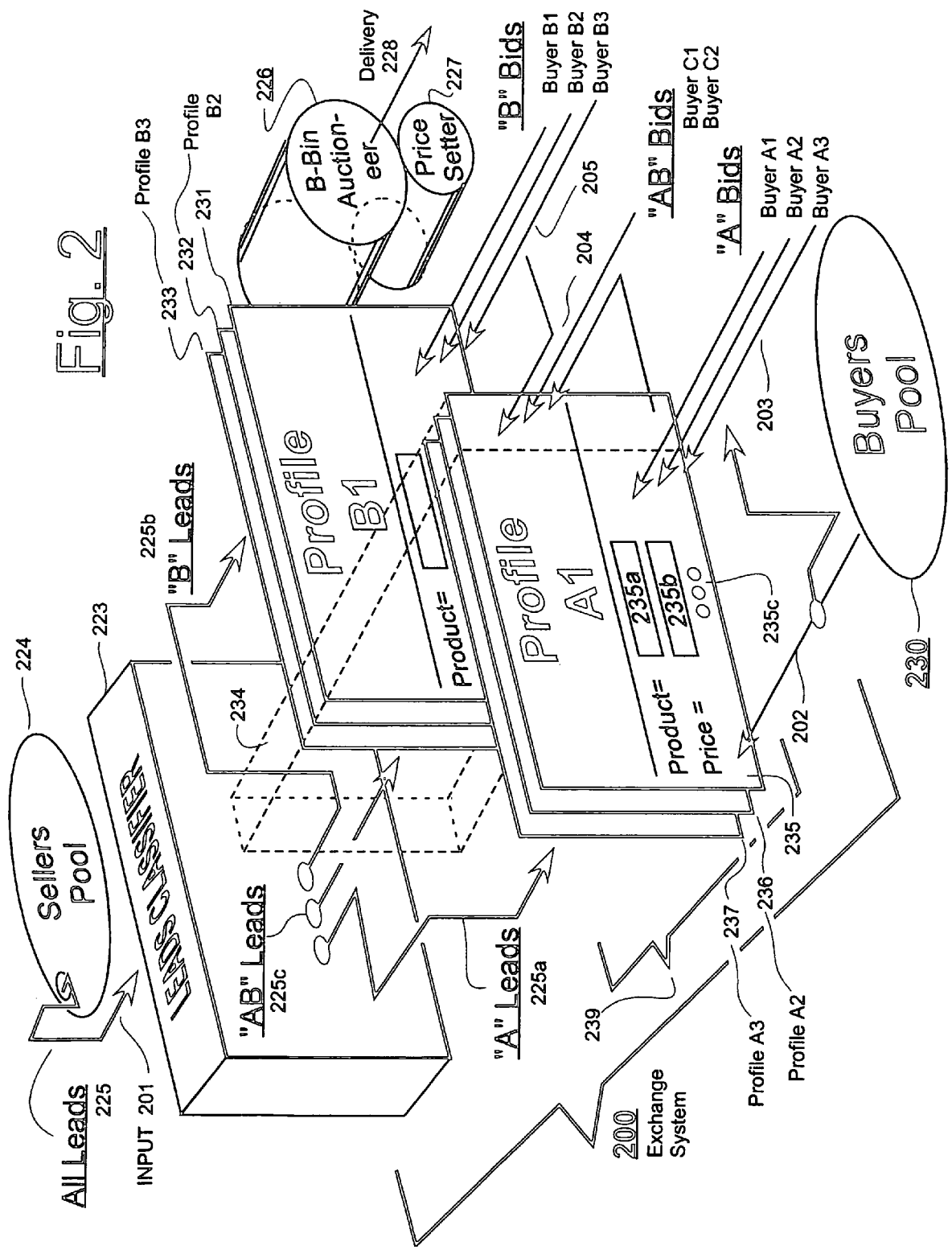
FIG. 2 is a perspective schematic showing a leads classifying and bids matching mechanism in accordance with the invention.

FIG. 2 is a perspective schematic showing a leads-and-bids managing system 200 in accordance with the invention. Where practical, like reference numbers in the "200" century series are used for elements of FIG. 2 which correspond to, but are not necessarily the same as elements represented by similar reference numbers of the "100" century series in FIG. 1. Thus, sellers pool 224 (top left of FIG. 2) corresponds to pool 124 of FIG. 1. Buyers pool 230 (bottom right of FIG. 2) corresponds to pool 130 of FIG. 1.

The leads/bids exchange system 200 includes a leads receiving means 201 for receiving streams of lead-defining data structures 225 from the sellers pool 224. The managing system 200 also includes a profiles receiving means 202 for receiving bid profile structures (or specifications therefore) from the buyers pool 230. Received or otherwise specified profiles are stored in a profiles storage area 239 of system 200.

A first sample profile, A1 is schematically shown at 235 as being stored within storage area 239. As further seen, the first profile data structure includes a product defining region or field 235a in which one or a first range of products are defined. The A1 profile 235 may further include a price or value defining region or field 235b in which one or a range of vending prices or property values are defined for the product bundle specified in region 235a. The A1 profile 235 may further include other profile attributes 235c for specifying desired characteristics of prospective consumers and/or of other aspects of a desired vendor-consumer transaction related to the product(s) specified in first region 235a. A first buyer of pool 230 is designated as buyer A1 and is understood to be a selector, supplier and/or creator of the first sample profile 235 (the A1 profile).

A second buyer of pool 230 is designated as buyer A2 and is understood to be a selector, supplier and/or creator of a second profile 236 whose transaction-describing fields (not shown) substantially match the product (235a), price/value (235b) and other (235c) transaction-describing fields of first profile 235. Similarly, a third buyer of pool 230 is designated as buyer A3 and is understood to be a selector, supplier and/or creator of a third profile 237 (Profile A3) whose transaction-describing fields (not shown) substantially match the transaction-describing fields 235a-235c, etc. of the first and second profiles 235-236. Because of this substantial overlap of field data, profiles A1, A2 and A3 will be competing with one another for acquisition of leads that substantially satisfy (match) the transaction-specifying or requisitioning fields 235a-235c of the first and other profiles 235-237. In one embodiment, a same buyer can have multiple bids, for example A4a, A4b, and A4c (not shown) all from buyer A4 and all logically placed in the Profile-A stack 235-237. The system checks for such a condition, and if multiple bid profiles of buyer A4 beat out other bids, the system automatically rejects the excessive higher ones of A4's bids so that A4 does not end up bidding against himself. In other words, the process ensures that if a single buyer has multiple profiles defined that can win, the lowest exclusive or nonexclusive bid price is declared as the winner(s) of respective exclusive of nonexclusive contests—buyers don't bid against themselves in the embodiment.

It is to be noted that profiles do not each need to contain all the data that categorizes them relative to incoming leads. In some cases, product bins may be created for separately storing profiles for Product-X, Product-Y, Product-Z and so forth. Within each of the product bins, say the Product-Y bin, further subdivision bins may be created for separately storing profiles designating vending price Ranges YR1, YR2, YR3, etc (or property value ranges). Within each of the price/value range bins, say YR3, further subdivision bins may be created for separately storing profiles designating prospective consumers of excellent, good, fair and poor attributes. Accordingly, each profile data structure need not store such broad categorizations and may instead merely store or point to a bid price (e.g., 203) and may identify the corresponding bidder (e.g., A1). Leads may be matched into the major and minor storage bins of the profiles according to the corresponding attributes of the leads.

A leads classifying means 223 is operatively coupled to input port 201 for sorting among the received leads of a given time span and for allocating the received leads to auction bins corresponding to matching ones of submitted bid profiles, i.e., profiles A1-A3 (235-237). Thus some of the incoming leads 225 will satisfy the transaction specifications of only the "A" profiles in storage area 239 and this first subset of leads will be designated by classifier 223 as the "A" leads 225a for the given bidding or auctioning period. (In one embodiment, bidding and/or auctioning occur in substantially real time, meaning that leads tend to be sold, if at all, roughly within 50 milliseconds or less after each valid lead is received and validated.) Others of the incoming leads 225 will satisfy the transaction specifications of only a "B" set of profiles (231-233) held in storage area 239 and this second subset of leads will be designated by classifier 223 as the "B" leads 225b for the given auctioning/bidding period. Yet others of the incoming leads 225 may satisfy the transaction specifications of both the "A" profile set 235-237 and the "B" profile set (231-233) and this third subset of leads will be designated by classifier 223 as the "AB" leads 225c. Simultaneous satisfaction of both the "A" and "B" profiles is possible because each profile set can specify ranges of product(s) (i.e., 235a) and/or prices (i.e., 235b) and/or other attributes (i.e., 235c) and these unitary or range specifications may have areas of commonality or overlap. Phantom region 234 represents the overlap domain or bin of the "A" and "B" profiles (231-233 and 235-237). Note that classification occurs on a per-auctioning period basis. Bid profiles can change from one auctioning period to the next. Thus there may not be any fixed classification boundaries for use by the leads classifying means 223. The classification boundaries can dynamically change as various bid profiles are brought into play (activated) or taken out of play (deactivated) within the system.

Regarding the "B" profiles, 231-233; these are understood to have been selected, provided and/or created by respective buyers B1-B3 of the buyers pool 230.

During or prior to a specified auctioning or bidding period, respective buyers A1, A2 and A3 will submit bid specifications 203 for leads satisfying their respective profiles, 235-237. Respective buyers B1, B2 and B3 will similarly submit or have submitted bid specifications 205 for leads satisfying their respective profiles, 231-233. Although not shown, buyers C1 and C2 may have submitted respective profiles fitting into the AB overlap region 234. During or prior to the specified auctioning/bidding period, these respective buyers, C1 and C2 will similarly submit bid specifications 204 for leads satisfying their respective profiles in overlap zone 234.

During an active auctioning or bidding period, a bids-and-leads matching mechanism (not specifically shown) plays the received and stored leads against received and stored bids in respective auction bins or buckets to determine which bid or bids are the winners. "A" leads 225a are played against the "A" bids 203 of the profiles 235-237 to which the "A" leads 225a were matched by the classifier 223. "B" leads 225b are played against the "B" bids 205 of profiles 231-233. "AB" leads 225c are placed into play not only with the "C" bids 204 of overlap zone 234 but also with the "A" bids 203 and the "B" bids 205. An auctioneering mechanism (i.e., 226) is instantiated for each matched bundle of leads. For simplicity sake, consider first the "B" leads 225b that were matched only to the "B" bids 205 of profiles 231-233. For each successive "B" lead in matched bundle 225b, the instantiated auctioneer 226 tests the supplied bids 205 looking for the highest, exclusive bid (if any) and/or for the revenue-maximizing set of nonexclusive bids (if any) and picks the exclusive or nonexclusive option that maximizes revenue for that lead. In one embodiment, the highest two nonexclusive bids are used to define the revenue-maximizing set of nonexclusive bids. In a second embodiment, the highest four nonexclusive bids are used to define the revenue-maximizing set of nonexclusive bids. Other limited numbers (i.e., in the range 2-10) of the highest nonexclusive bids may instead be used to define the revenue-maximizing set of nonexclusive bids.

Although not shown, in one embodiment each bidding profile (i.e., 231) may specify one or both of a maximum number of leads to be accepted over a prespecified time period (e.g., a geographically local 8 hour period) and/or a maximum amount of money to be spent on leads during the same or another prespecified time period. As maximums are hit for various ones of the "B" profiles 231-233, the maxed-out profiles fall out of the bidding battle (they are deactivated) and next successive leads are bid for by the remaining profiles. In one embodiment, this first-in, first out approach provides incentive for lead sellers to stream their leads in according to corresponding time zones of bidders around the globe because the early bird in each time zone will probably mate with the highest bids. Daily purchase caps of lead buyers are specific to the time zones of the buyer. Specified purchase limits of buyers need not be set on a per local day basis. They can be set for other time spans such as per local week or per hour according to the desires and lead-handling bandwidths of specific buyers.

In one embodiment, even after a given highest exclusive bidder has won a corresponding lead or a revenue maximizing set of nonexclusive bids has outbid the exclusive bidders for, and thus won that lead, the price paid for the corresponding lead may be down-adjusted to be less than the winning bid amount. Such selective discounting may be carried out by the illustrated price setting mechanism 227 coupled to auctioneer 226. Discounting may occur if a quality feedback feature is active and the seller of the corresponding lead has earned a poor rating based on earlier sold leads. The poorly-rated seller is, in essence, forced to pay back to the seller group 230 for having earlier sold inferior leads (leads that are rated by a sampled subset of buyers as being comparatively inferior). The price setter 227 automatically forwards a credit for the set price to the seller of the auctioned lead. It also instructs the auctioneer 226 to automatically deliver 228 the auctioned lead to the winning one exclusive bidder (i.e., B1) or the winning subset of nonexclusive bidders (i.e. B2-B3) in that auction bin. In one embodiment, sellers are blocked from cashing out their credits until a predefined, dispute resolution period lapses.

In one embodiment, the discount factor is normalized as 0% discount for sellers rated as being in the top 25% based on the seller-rated qualities of their earlier-offered leads. The remaining 75% of sellers are banded into discounts ranging from 5% to 75% markdown. (No seller gets a 100% or greater markdown.) By way of example, assume the bid matching engine has decided that an exclusive bid, A5 (not shown) of $100 is the winner. The price setter 227 however privately determines that the seller belongs to the 50% markdown band due to previous ratings from trusted and/or randomly selected sellers. The winning amount is therefore marked down by the markdown factor to arrive at a charge to the winning buyer of just $50 for that lead—the reason being that the lead came from a less than stellar seller (one not in the 0% markdown band). An accounting engine (not shown in FIG. 2) then debits the buyer's account by roughly that $50 amount, and credits the seller's account by roughly that amount, the more exact amount being the settlement price minus a small commission (i.e. $1) that flows to operator of the leads-and-bids exchange system 200. There is no settlement situation or separate accounting for the discount. In one embodiment, sellers are blocked from cashing in their currently awarded credits until after a predefined dispute resolution period passes. During that delay time, the operator of the leads-and-bids exchange system 200 may determine that a given seller is not eligible to get paid because the sold leads where fraudulent. In one embodiment, the dispute resolution period is seven days.

Aside from providing a quality markdown for leads offered by an inferior seller, the price setter 227 of one embodiment also includes a highest-bidder discount mechanism (i.e. a novice-buyer discount mechanism). This prevents a novice or accidentally mistaken bidder among a group of more seasoned or less erroneous bidders from unknowingly bidding too high (way above market price). For example, in a shared lead scenario, the price setter 227 might deem it unfair that the four winners are paying substantially different prices for the same lead and might reduce the price charged to the highest of the four winners, for example lowering it to the same level as that of the lowest winner in the winning group. In another embodiment the price setter 227 may reduce the highest of a winning set of nonexclusive bids down to the average of the original winning bid set or to the average of the other winners in the set.

Considering now, the more complex case of the "AB" overlap zone 234, the correspondingly instantiated auctioneer (not shown) scans all the "A" profiles 235-237 and all the "B" profiles 231-233 as well as the matching "C" profiles (204) to find the highest exclusive bidder or the revenue maximizing, but limited subset of nonexclusive bidders for each successive lead in the "AB" matching bundle 225c. It is often advantageous to sellers under this system to provide leads that match with as many of the submitted profiles (A, B and C) as possible so that their leads will receive the highest one or combination of bids. The system indirectly encourages sellers 224 to meet the profiled demands of the lead buyers 230. The system encourages lead buyers to fine tune their profiles 231-233, 234, 235-237 so as to mate with incoming leads that provide best value for the corresponding bid amounts 203, 204, 205. The system may be operated in a semi-publicized or semi-open manner so that lead sellers can easily discover what profiles (but not which buyers) are offering the highest bids and lead buyers can discover what leads (but not which sellers) are receiving the lowest and highest bids. Each side may tailor its bid and offer strategies accordingly.

Figure 3:
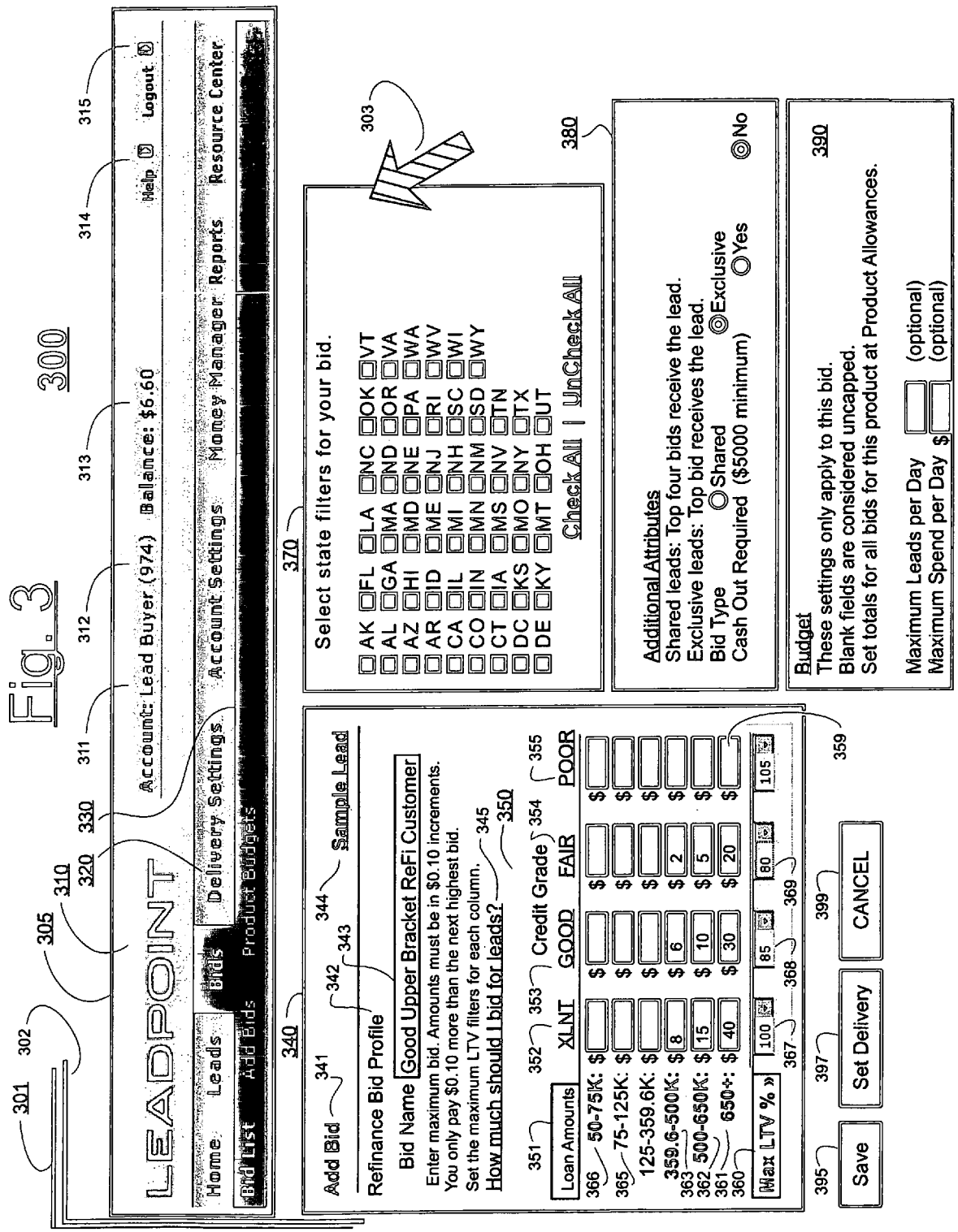
FIG. 3 is shows an example of a bid profiling data structure for use by vendors who offer loan refinancing services.

Referring to FIG. 3, a sample profile structure 305 is shown in the form of an on-screen GUI display (Graphical User Interface display). The GUI display 305 may be generated on a computer monitor or another form of visual-generating interface 302. The user may employ a mouse-driven cursor 303 and/or a data entry keypad (not shown) for interfacing with the GUI display 305. Partial frame 301 represents the computer system (or other automated machine means) which operatively interfaces with GUI display 305. Item 300 represents the full operative system including automated machine means 301, display means 302, GUI means 305 and network interface means (not explicitly shown).

A first menu bar 310 within GUI 305 includes an identification by name 311 of the buyer (the bidder or user) and/or his/her account number as indicated at 312. The system may optionally indicate of how many other bidders or profiles are participating in auctions for the given product (i.e. refinance) on the network the system may provide an indication 313 of how much credit the given buyer account has within the system for purchasing additional leads. The first menu bar 310 further includes a help invoking button 314 and a log-out invoking button 315.

A subsidiary menu bar 320 within GUI 305 includes pop-out menu headers denoted as "Home", "Leads", "Bids" and "Delivery Settings" among others. The Bids menu header is highlighted in the example to indicate it has been selected by the user. A third menu bar 330 with continued highlighting from the highlighted Bids item in bar 320 allows the user to pop up a listing of his current bids ("Bid List"), to create a new bid profile ("Add Bids")—which the user is currently shown doing—and to define limits on how much will be spent for leads for one or more of ongoing, lead procurement projects for respective products ("Product Budget"). Not shown is the fact that the user had first selected a product or product type, in this example—Refinance, before the exemplary profile-defining screen 305 appeared. Item 342 indicates the selected product type. Had the user picked a different product, then a somewhat different profile-defining screen will generally appear. In one embodiment, profile-defining screens (e.g., 305) are product specific.

Rather than picking "Bids" on bar 320, if the user had instead selected the "Leads" menu, a set of other options would have been displayed in continuation area 330 related to leads that this given buyer (bidder) has acquired through bidding on the system. (See FIG. 4B.) Had the user instead selected the "Delivery Settings" menu of bar 320, a set of other options would have been displayed in continuation area 330 related to selection of methods by which acquired leads are to be transmitted or otherwise delivered to this given buyer or to a third party recipient. The "Account Settings" menu item provides a pathway by way of which the logged-in buyer can manage his account. The "Money Manager" menu item provides a pathway by way of which the logged-in buyer can manage his expenditures. The "Reports" menu item of bar 320 provides a pathway by way of which the logged-in buyer can specify and generate various database reports of interest. The "Resource Center" provides user help. In one embodiment lead buyers and lead sellers register into the system online over a network such as the internet and establish user accounts as appropriate, including establishing money-payment credits by way of secured payment methods known in the art. The system may include means for challenging the identifications of the registering users so as to validate the probable truthfulness of the information they provide (i.e. by requiring confirmation within a specified time by way of the user email account which the registrant gave as being their primary email contact; and/or by cross-checking independent sources where similar user identification information may reside).

GUI region 340 represents a first filtering mechanism for creating, specifying or otherwise defining the bidding profile. Displayed item 341 reinforces to the user that the user is carrying out an "Add Bid" operation on system 300. Displayed item 342 reinforces to the user that the product selected earlier is a "Refinance" service offering and that this is a bid profile for bidding on leads to such a vendible product. Displayed and user-invokeable item 344 allows the user to pop up a display of a sample lead for the selected product (342). Displayed and user-fillable item 343 allows the user to give a specific name or other identification to the current bid profile. Displayed and user-invokeable item 345 allows the user to pop up a help window which provides tips on what value the user should ascribe to his or her bids for the profiled leads.

GUI region 350 defines the actual bids made by this profile 343 for leads to prospective consumers having respective credit ratings designated as excellent ("XLNT") at 352, GOOD at 353, FAIR at 354 and POOR at 355. In one embodiment, items 352-355 are user-activateable to display help windows showing more detailed information on what constitutes an excellent credit rating as opposed to a good, fair or poor one. In one embodiment, the user is allowed to custom tailor these definitions.

The leftmost column 351 of GUI region 350 displays predefined pricing categories or ranges for the selected product, Refinance services (342). In the illustrated example, the user has decided to bid $40 for each lead that satisfies the combined criteria of loan amount in the range $650,000 or higher (row 361) and an excellent credit rating (column 352) for the refinance applicant. In the same illustrated example, the user has decided to bid $30 for each lead that satisfies the combined criteria of loan amount in the range $650,000 or higher (row 361) and a good credit rating (column 353). On the other hand, in the same illustrated example, the user has decided to bid just $5 for each lead that satisfies the combined criteria of loan amount in the range $500,000 up to 650K (row 362) and a fair credit rating (column 354). The user has elected to not bid (a $0 bid by default) on leads that point to potential refinance applicants that have a poor credit rating (column 355). Empty bid specifier box 359 represents such a no-bid decision. These bids and no-bids are the valuations that this particular bidder places on respective leads satisfying the row and column criteria of region 350. Another bidder may have defined an entirely different set of valuations, or not. If not, the two bidders will be bidding against each other since their profiles overlap.

Bottom row 360 is unique to loan-type products and allows the bidder to establish a further filter, per bidding column, for a so-called Loan-To-Value (LTV) ratio that defines the ratio between the new loan amount that will be placed on the mortgaged property versus the appraised value of that property. Some bidders may insist on very low LTV values and will thus set the Maximum LTV as a low percentage (e.g., below 50%) while other bidders may desired leads to prospective consumers where the maximum LTV is even greater than 100%. Note that column 355 shows a selectable, maximum LTV of 105%.

GUI region 370 displays user-selectable geographic filters. With cursor 303, the user may single click to Check All and then deselect some with check box toggle operations. The user may UnCheck All and then toggle a few boxes on. The geographic criteria will generally be for the location of the mortgaged property. However, in an alternate embodiment, it may alternatively or additionally specify the primary residence of the prospective consumer.

GUI region 380 displays user-selectable additional attributes. In the illustrated embodiment, "shared leads" are shared among the top four bids. The top four bids may all be from a same bidder but submitted by way of four separate bidding profiles. The limited scope of shared lead acquisition may be modified from a maximum of four bidders per group to another plural number depending on product and/or other variables.

GUI region 390 allows the bidder to selectively control the maximum number of leads he or she will buy in a given day under the displayed profile and/or the maximum amount that will be spent for buying, profile-satisfying leads. Aside from the budgeting features 390 of the one displayed profile 340, bidders may also use the "Account Settings" (in bar 320) to limit their global spending and global number of daily acquired leads.

Although GUI window 305 enables a bidder to fill in a bid profile, such filling in of a bid profile does not necessarily of itself place the bid profile into a live auctioning session. In one embodiment, the bidder has to invoke an "Activate Profile" button in a separate, live auctions window (not shown). The illustrated window 305 allows the user to "Save" the filled-in and identified (343) profile for activation at a later time. Alternatively, the user may click on the Cancel button 399 to wipe the slate clean without saving the filled-in specifiers. The illustrated, "Set Delivery" button 397 allows the user to establish specific lead delivery instructions for leads won by the given bid profile.

Figure 4A:
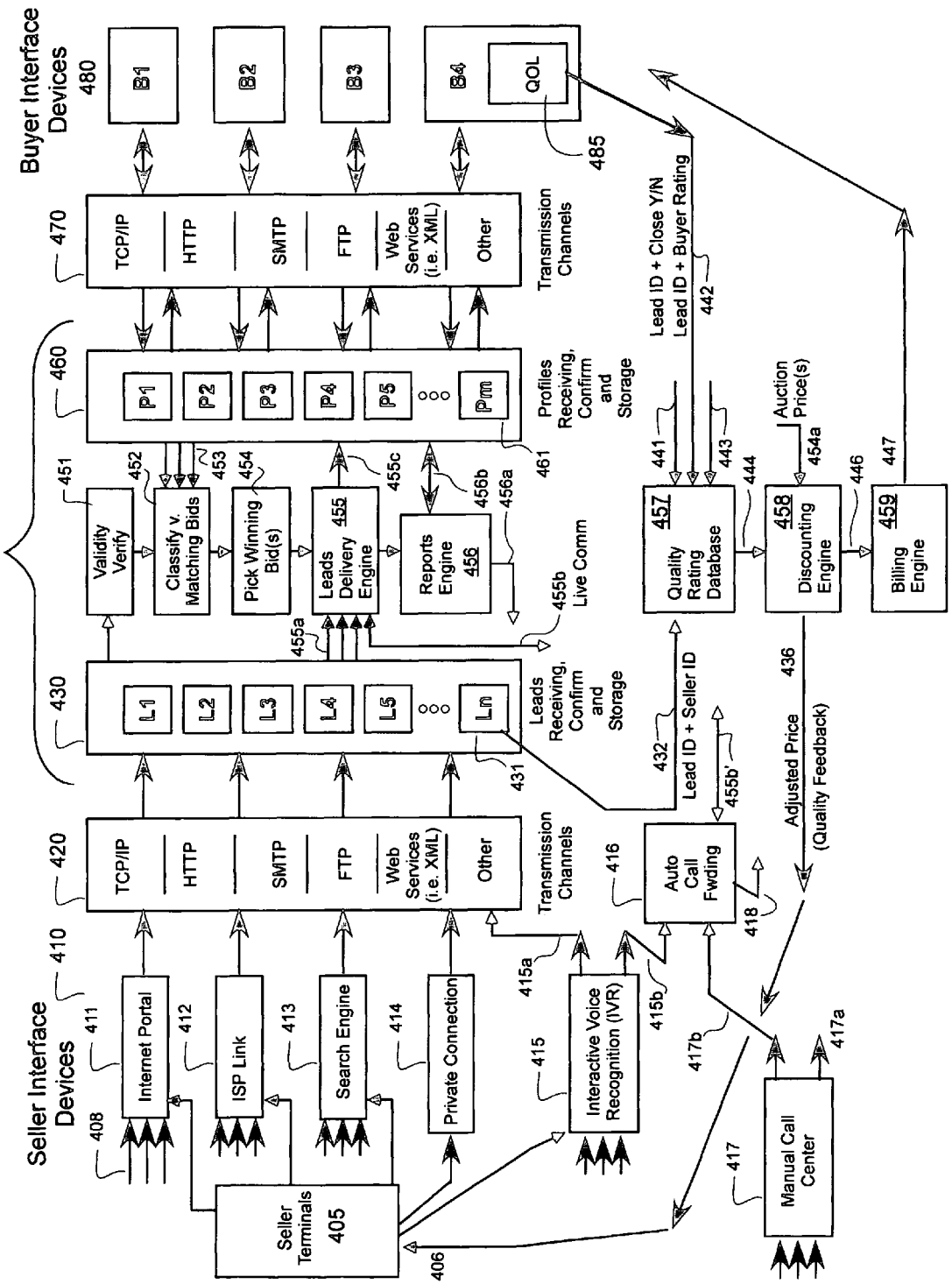
FIG. 4A is a schematic diagram of an auctioning system that receives profile specifications from buyers, leads from sellers, and conducts auctioning of supplied leads among activated profiles of buyers participating in respective auctions.

FIG. 4A is a schematic block diagram of a bids-and-leads processing system 400 in accordance with the invention. In the diagram, lead sellers supply their information from the left while buyers supply their information from the right. Sellers may use various, seller-side interface devices 410 for communicating with a core portion 450 of the system 440. Buyers may use various, buyer-side interface devices 480 for communicating with the core portion 450. System features used in the seller-side interface devices 410 will often differ from those used in the buyer-side interface devices 480 since the two groups of system users have different goals. However, it may be advantageous to provide integrated buy-and-sell software to all users, installed in their respective interface devices (410 and 480), and let them decide when they want to operate as buyers and when as sellers of leads for various products.

Some types of sellers rely on so-called Internet portals 411 for attracting large numbers of prospective consumers 408 to their web sites so as engage the attracted visitors with the possibility of converting their visits into generated leads for various, sponsoring products. Some types of sellers provide ISP service sites 412 and thereby attract large numbers of prospective consumers so as engage the visitors and convert the visits into leads. Examples of other prospect attracting mechanisms include but are not limited to: provision of free search engine services 413, web directories, special content sites and so forth. Leads might also be generated and captured in telephone call centers and/or by regular mail solicitations.

FIG. 4A shows an automated call processing unit at 415 and a manual call processing center at 417. Each of the automated and manual call processing means (415, 417) couples to an automated call forwarding unit 416. So-called, hot connection phone conversations may be placed momentarily on hold by either of the respective automated and manual call processing means (415, 417) and then forwarded with no apparent interruption to a lead buyer by way of the automated call forwarding unit 416 and forwarding connection 418. Bus 455b' couples to a so-called, leads delivery engine 455 which will be explained below. The leads delivery engine 455 can direct the automated call forwarding unit 416 to direct a given one of plural incoming calls for forwarding through connection 418 to a winning bidder.

Automated lead generating programs may run in the various lead-capturing environments 411-413, 415 for controlling the lead capture process. For example, in the automated call processing unit 415, an interactive voice recognition (IVR) process may run for allowing a prospective consumer to respond with touch tone and/or voice responses to pre-defined question sequences generated by the IVR process such that the IVR subsystem generates a digitized lead from the responses provided by the prospective consumer. (Other terms for IVR may include VRU—voice recognition units, ISR—interactive speech recognition and so forth. The units may include automated dialers as well as automated voice interface with prospective consumers.) The IVR process may encoded to include a CallXML interface (an industry standard Extensible Markup Language or XML that is directed to providing telephony interface between human user and machine) or it may be encoded to include a VoiceXML interface (another industry standard) or any other appropriate, semantically tagged or other man-machine interface.

The digitized lead data which generated by the IVR is forwarded via lead processing path 415a to lead receiver 430 while the call (analog or digital) is momentarily placed on hold along bus 415b. Shortly afterwards, unit 416 forwards the on-hold call to a winning bidder and the winning bidder picks up the transferred hot connection call and continues manual conversation or continuous automated IVR processing with the on-line prospective consumer as may be appropriate. In similar manner, digitized leads generated by a manual call processing center such as 417 are forwarded by path 417a to core 450 while the on-hold call feeds to the automated call forwarding unit 416 by way of path 417b. The manual telephone operator in center 417 may tell the prospective consumer, "hold on one second while I transfer you to one of our specialists" and then unit 416 forwards the on-hold call to a winning bidder as selected by the exchange core system 450 (by a winner selector 454 within the core).

Before a winner is selected though, the automated call processing unit 415 and/or others of the lead various lead-capturing environments 411-413, 417 will have transferred their captured lead specifications to the system core 450 by way of appropriate, seller-side communication mechanisms 420. Examples of communication mechanisms include TCP/IP or similar networking protocols in general, HTTP based interfaces, SMTP or other email interfaces such as SMS, FTP or other data transfer protocols, Web Service protocols such as SOAP and so forth. Sellers may control their respective lead attracting and generating mechanisms 411-413 from respective seller control terminals 405. Alternatively or additionally, sellers may couple their control terminals 405 to the core 450 by way of various private connections 414 (wired or wireless).

While most of the data flowing from the sellers' interface devices 405-410 into the core portion 450 of the system comes in the form of digitized leads or lead specifications and/or hot connections, one kind of data that may flow back from the core 450 to the sellers' interface devices 410 in accordance with the invention comes in the form of lead-processing feedback factors. These lead-processing feedback factors may include error and status indicating codes, indicators of the amounts of monies earned by the seller for one or more lead sales, and other quality feedback items 406 as will be detailed below. The seller-side interface devices 410 (or seller/buyer integrated software) are accordingly configured to not only produce lead data (classifiable lead descriptor data, see 510 of FIG. 5) for processing by the core 450 but also to receive and/or display the final-adjusted price credited to the seller's account for one or more given sales of a corresponding one or more leads and/or quality feedback items 406 received from the core 450 (including returned and disputed leads that had been bought). The feedback adjusted price and/or quality feedback items 406 do not generally appear on public portions of the seller's public attractor sites 411-413 but rather on private regions of the sellers' respective control terminals 405.

Block 430 represents a first core storage area where leads are received and stored. Receipt and storage of leads may be optionally confirmed back to the sellers' respective control terminals 405 via the seller communication channels 420.

After receipt, each lead (L1, L2, . . . , Ln) is automatically processed by a validity verifier 451 to assure that the received lead appears to be legitimate. Automated validity verification may include pinging email or other addresses provided in the received lead data (e.g., 431) to verify that the addresses are legitimate. Validated leads are assigned unique lead identifications (Lead ID's).

The validated and uniquely identified leads are next sent to a classifying-and-matching unit 452. As briefly explained in FIG. 2, each lead is mated to as many of the available and active profiles 453 in the system whose requirements (lead specifications) that lead can validly satisfy. Exact matching is not always necessary. In some embodiments, less than full matching of leads to profile specifications is allowed (providing the bidder authorizes it) and the bidder of a less than fully matched profile is awarded a discount if his bid wins in the competition for the lead.

Competition for the validated and matched lead occurs in unit 454. There, a bidding contest or auction is conducted and one or more winning bidders are selected depending on whether the winner of the contest was an exclusive bidder or a set of sharing bidders. The ID's of the sold leads and the ID's of the winning bidder or bidders is sent to a delivery engine 455 so that sold leads are removed from the first storage area 430 and transferred for delivery according to the wishes of the winning bidder(s).

The illustrated, second storage area 460 of core 450 contains the activated and competing bid profiles (P1, P2, ..., Pm). Each of these bid profiles (e.g., 461) came into being within storage area 460 as a result of buyer data sent by way of transmission channels 470. The transmitted buyer data can include one or more of the actual data for the bid profiles (P1, P2, ..., Pm) or instructions for specifying what information is to be stored in, associated with, or activated within the buyer's bid profile (e.g., 461). As in the case of the seller-side transmission channels, the buyer-side channels 470 may include accommodations for communication mechanisms such as TCP/IP in general, HTTP based interfaces, SMTP or other email interfaces, FTP or other data transfer protocols, Web Service protocols such as XML based content and so forth. Channels 420 and 470 may be partially or fully integrated with one another. It is quite possible for some system users to function during a given day both as buyers and sellers or resellers of leads.

When a given lead is purchased by a buyer, it does not always have to be immediately delivered into the buyer's possession. Identifications of acquired leads can accumulate in delivery engine 455 for a specified period of time and can thereafter be batch delivered to the appropriate exclusive buyer or appropriate set of sharing buyers. The three schematic arrows of item 455a represents a batchable set of lead data that can be stored and delivered to the appropriate buyers at a substantially later time than the time of purchase. In one embodiment, the delivery engine 455 keeps track of the aging of deliverable leads it has stacked in its memory and delivery is initiated ahead of schedule if some leads age beyond a predefined threshold.

In some instances, delivery of leads cannot be delayed by more than a very small amount of time (i.e. 0.1 minutes to 3 minutes, or less) because the lead includes a "hot connection," meaning that some party (e.g., a prospective consumer) is currently waiting on a telephone line (e.g., on lines 415b or 417b) or other live communications means (e.g., instant messaging link) and the seller needs to hand over (transfer, forward, etc.) control of that "hot connection" to the buyer relatively quickly (i.e., within 500 milliseconds) so that the buyer can continue the established communication and try to convert that communication into a lead closure. Item 455b represents such a live communication. The delivery engine 455 of one embodiment includes means for differentiating between leads that include hot connections or not, and for prioritizing different kinds of leads according to their aging (if appropriate) and urgency for immediate delivery. Accordingly, if a seller has had a prospective consumer on hold, on line 417b (for example) for a long time and another, non-hot lead (e.g., in group 455a) is sold first, the delivery engine 455 may include means for prioritizing the hot connection lead 455b as requiring delivery first and for accordingly delivering lead 455b soon after a corresponding buyer has purchased that hot connection lead 455b. In general, hot connection leads such as live or on-hold phone calls should be sold and transferred to the lead buyer as soon as practical (e.g., within less than 2 seconds of their initial capture and offer to sell). Connection 455b carries the transfer instructions for live or hot communications. The automated call forwarding unit 416 discussed above is an example of a means for redirecting a hot communication to a winning bidder.

After a given buyer (say B4 of user device group 480) has received delivery of a paid-for lead and has tried to convert the lead into a deal closure, the given buyer (B4) may discover that the purchased lead is defective in some way. In accordance with the invention, the buyer's interface device (e.g., B4) includes quality-of-lead descriptor means (QOL 485) for allowing the buyer to indicate what one or more defects the buyer found in the purchased lead.

Figure 4B:
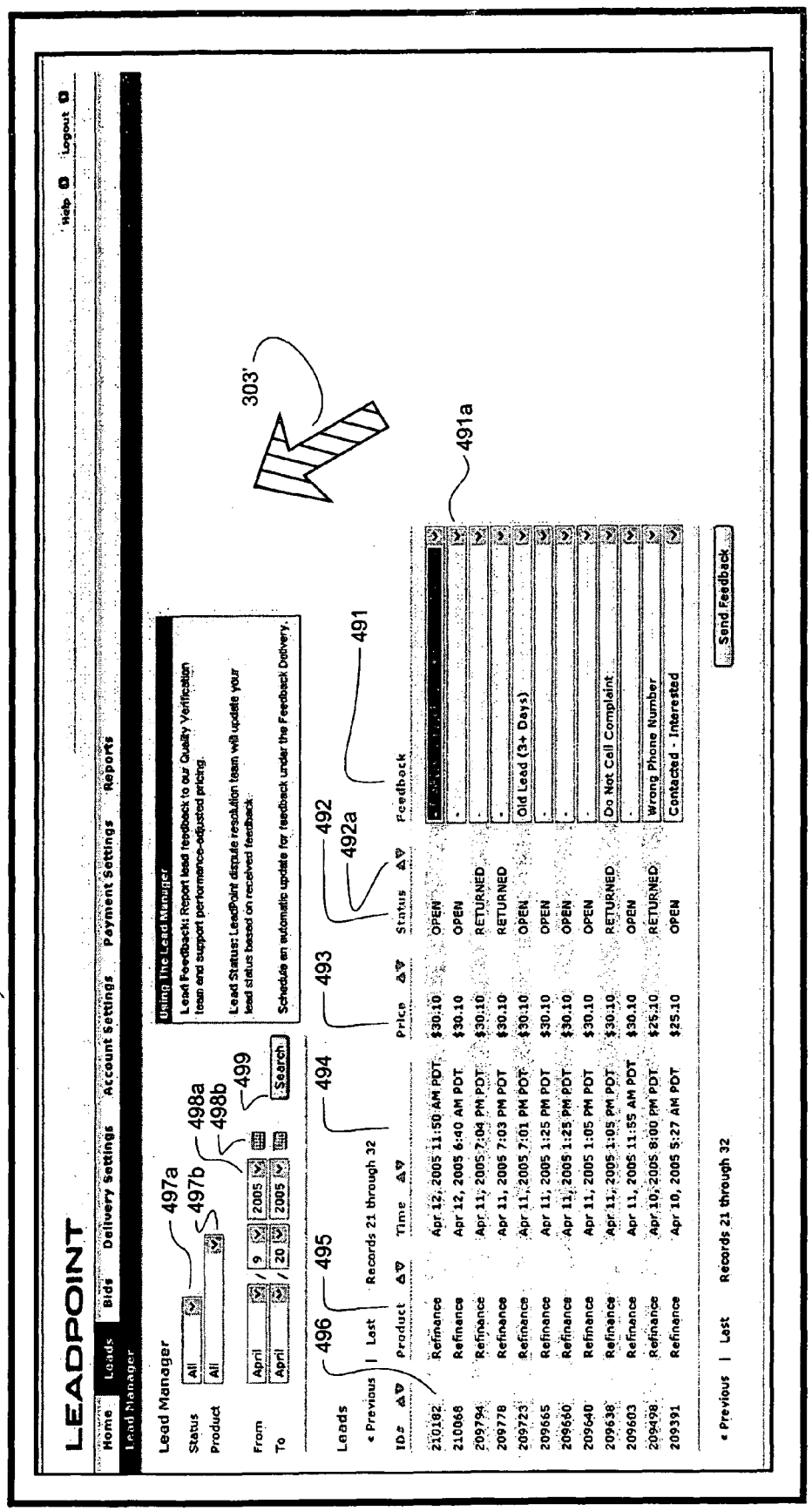
FIG. 4B shows an example of a leads management page for use by a buyer, which page includes a leads quality feedback mechanism.

FIG. 4B shows an example of a leads management page 490 for use by a buyer, which page includes a leads quality feedback mechanism 491. As seen, the buyer may conduct a database query of leads purchased by that buyer over a given time period and on a per product basis or for all products. Each lead has a unique ID number 496 listed in the resulting report. Also listed are the product descriptor 495, date 494 and time 493 of purchase of the lead and price paid. Status 492 indicates the work-in-progress status which the buyer has currently assigned to the lead. In one embodiment, a bought lead that has not yet been opened and looked at is given a null status. A purchased lead that has been opened and has the buyer (or vendor agent) currently working on further developing the lead is denoted as OPEN meaning work is in progress. Sometimes after a buyer opens and works on a lead the buyer discovers that the lead is defective for any of a number of reasons (i.e. it is a duplicate of an earlier opened lead). In such a case, the buyer may return the purchased lead with a reason for rejecting it and may demand a refund of the purchase amount. A status of RETURNED may indicate the buyer will not need to pay for this lead due to quality issues with the lead such as it providing a disconnected phone number. Sort buttons 492a allow the user to sort the listing in ascending or descending order per the activated column. Each feedback line in column 491 allows the user to pick from among a variety of lead quality indicators, both positive and negative. Thus, clicking on pop-down indicator 491a opens up a menu of user selectable options for indicating lead quality.

An example of a positive indicator is "contacted-interested" which means the prospective consumer was successfully contacted (the phone number is good) and that consumer indicated interest in the offered product(s). An example of a negative indicator is "wrong phone number" which means the prospective consumer was not successfully contacted because the phone number given by the lead appears to be a wrong one. Other lead quality indicators in accordance with the invention may include one or more qualities for one or a set of obtained leads indicating: (a.1) it/they did lead to a making of contact with prospective consumer(s); (a.2) it/they did lead to a making of contact with prospective consumer(s) and consumer(s) indicated initial interest in offered product; (a.3) it/they did lead to a making of contact with prospective consumer(s) but consumer(s) indicated change of mind and no further interest in offered product; (a.4) it/they did lead to a making of contact with prospective consumer(s) and lead successfully converted at least into initiated business transaction(s) (i.e., refinance application(s) was/were filed); (a.5) it/they did not lead to a making of contact with prospective consumer(s) because of wrong phone number given; (a.6) it/they did not lead to a making of contact with prospective consumer(s) because of phone number given was to disconnected line or to a facsimile machine; (a.7) it/they did not lead to a making of contact with prospective consumer(s) because invalid contact data was given; (a.8) it/they led to making of contact with party who had requested a do not call status; (a.9) it/they was/were stale (i.e., 3+ days old); and (a.10) it/they was/were duplicates of earlier acquired lead(s). Yet another transmittable indicator of lead quality may be one that indicates whether the identified lead converted into a closed deal (150) or not (149). The given buyer can activate the "send feedback" button each time he or she wants to send lead quality feedback signals (manufactured signals) to the leads-and-bids managing system 400. In one embodiment, feedback transmission may be scheduled to occur automatically at specified times. In one embodiment, rather than feeding back just data on a per lead basis, statistical data on percentages of deal closures and good/bad contacts for that buyer are also sent so that system administrators can see how well the system is serving the individual buyer.

Referring again to FIG. 4A, the QOL data 485 generated by buyer B4 is fedback along path 442. As explained above, the fedback quality data may include one or more of a lead identifier, a buyer's rating of the lead quality (e.g., wrong tel. number) and an indication of whether the lead converted into a close or not. Other buyers (e.g., B1, B2, B3) will have similar QOL means installed in their interface devices and will be able to send back similar lead feedback data along respective pathways such as 441 and 443. In one embodiment, not all buyers are empowered to return lead feedback data and/or the returned data of only of arbitrarily or selectively picked buyers is used in the receiving, quality rating database 457. Thus buyers do not know whose feedback data is being used or not to generate group ratings and the buyers cannot easily game the system. In one embodiment, the manager of the bids-and-leads processing system 400 decides which buyers are trusted ones whose feedback is to be always used by rater 457 for generating group ratings and/or which buyers are untrustworthy such that their feedback is to be never used by the rater 457 for generating such group ratings. In one embodiment, only a subset of processed leads is rated, where the rated subset is sufficiently large to get a statistically significant rating of the corresponding seller's leads quality.

Depending on context, seller ID's may or may not be hidden from the corresponding buyers before and/or after bidding. In one embodiment, after receiving the lead—seller identity is initially hidden from bidders at bidding time, but after purchase, the purchased lead may reveal to the buyer information about how the lead was generated. In other words, it is generally (but not always) desirable to hide the seller ID from intermediary re-sellers,—but sometimes revealing the identity of the lead seller to the ultimate buyer can assist the ultimate lead buyer with the closing of the lead (converting the lead), for example by enabling the buyer to indicate to the prospective consumer, where, when, and/or with whom the consumer first interacted when they gave out their contact and/or other information. Even in cases where seller ID's are always hidden from buyers, the quality rating database 457 has access to the linkage between seller identifications and lead identifications (e.g., through path 432) as well as to the feedback information provided by the buyers. The quality rating database 457 produces on line 444, a seller quality indication signal which is supplied to discounting engine 458.

In one embodiment, the price-setting/discounting engine 458 may be optionally deactivated so that sellers receive the full amount of each bid contest 454. When deactivated, auction or bid settlement price 454*a* (received from unit 454) simply becomes the adjusted price 436. When the price-setting/discounting engine 458 is active however, the discounting engine 458 can reduce actual auction/bid settlement prices 454*a* by a number of factors, including for example, the seller markdown amount calculated from the seller quality indication signal 444. This seller markdown factor can be calculated on a per-seller basis or on a per-seller's-leads-sourcing account basis (a given seller might have different sources of leads with different qualities). The markdown factor can also be made a function of lead-contained data and historical performance—so that markdown is to some extent computed on a per-lead basis. Different algorithms may be devised for the rate of reduction as may be appropriate depending on a variety of parameters, including but not limited to: feedback from actual consumers into the system, feedback from intermediary system operators (i.e., manual validaters as they perform manual screening of various leads), feedback from sellers regarding product, product price range, selling season, volume of leads and so forth. A high quality seller may receive 100% of the settled auction or bid price 454*a* (in other words a 0% markdown) while a medium quality seller may receive 80% and a poor quality seller may receive only 40%. The system rewards high quality sellers more so than poor quality sellers. The adjusted lead price 436 that is credited to the seller's account is also debited (via coupling 446) from the corresponding buyer's account so that the buyer pays less for leads won from poor quality sellers. The seller interface devices 410 may include display means for displaying privately to the sellers (e.g., on terminals 405) what the adjusted price was, or what the downward adjustment percentage was in a given time period. More detailed quality feedback data may also be sent back for display on sellers interface devices 410 such as average buyer rating by multiple buyers for that seller (line 442) and/or average buyer closing rate for leads sold by that seller. The seller may then adjust his or her behavior accordingly. Billing engine 459 couples by path 447 to the buyer devices 480 so that buyers can run database queries on how much they have spent for purchasing leads. More generally, a reports engine 456 may be provided in the system for generating database reports on allowed data for each of the seller and buyer groups. Path 456*a* connects to the sellers. Path 456*b* connects to the buyers. Buyers are blocked from seeing seller identifications. (Otherwise they might try to bypass the exchange system core 450 and deal with the sellers directly after having gained benefit of the core's production of seller ratings 444.) Sellers are blocked from seeing bid profiles 460. (Otherwise such sellers might try to limit the extent of their offerings and target only the highest priced bids.)

There are cases where certain lead buyers do not wish to purchase leads with low probabilities of conversion. For example they may not have the lead processing bandwidth (e.g., manpower) to handle large volumes of leads with low probabilities of closing. They are willing to pay more for leads that are pre-rated as having a relatively high probability of converting into a deal closing because this reduces their total lead-transaction costs. In one embodiment, profiles (e.g., 235 of FIG. 2, 461 of FIG. 4A) include an indication of one or more acceptable or not acceptable closing probabilities for the offered lead and the classifier (223, 452) matches leads to bids accordingly. In one embodiment, leads are segmented into probability bands, the bands indicating a subrange of probability between 0.0 and 1.0 (non-inclusive) that the lead will convert into a close if purchased and properly developed. Bidder profiles indicate which one or more of such probability bands are acceptable and/or not acceptable.

In one embodiment, the assignment of leads to respective, closing probability bands proceeds like this. A sorted list is generated by the exchange system 400 (or 200) ranking active sellers (or seller accounts) according to conversion rates reported for such sellers from the closure feedback (442) provided by buyers. The sorted list correlates volume of leads sold with the respectively sorted sellers/seller accounts. The report generator (i.e., 456) determines total volume of leads sold, as represented in the sorted list, and then identifies the top 30% (for example) by volume of the leads with relatively highest probability of closure. The sellers (or seller accounts) in that band are all assigned to closure probability band number 1 (the highest closure band). For the remainder of the sellers (or seller accounts) in the sorted list, the report generator (i.e., 456) determines the upper 50% (for example) by volume of the leads with relatively highest probability of closure. The sellers (or seller accounts) in that upper band are all assigned to closure probability band number 2 (the next highest closure band). For the remainder of the sellers (or seller accounts) in the sorted list, the report generator assigns them to closure probability band number 3 (the lowest probability of closure band). Bidders can then indicate which one or more of closure probability bands 1, 2 and 3 are acceptable to them, or not, and the leads classifier matches incoming leads accordingly. The reason that the sorted list may be according to seller account rather than seller identity is because some sellers have multiple accounts with different probabilities of closure. It is understood, of course, that the subdivision of bands given here, i.e., top 30% by volume and then 50% split of the remainder is merely an example. Any reasonable plural number of bands may be used (e.g., just two bands with the top covering the top 10% by volume of highest closers) and the dividing lines for determining which sellers or seller accounts belong in which bands may be set as appropriate for the product markets being covered.

Referring to FIG. 5, a flow chart for a leads processing method 500 in accordance with the invention is shown. The method 550 may be entered at 501. In step 510, classifiable lead data is received from one or more data channels. Not all lead data is necessarily classifiable. For example, analog information such as provided within a hot connection 455*b* may not render itself to being classified by the bids matching unit 452, yet it might constitute part of the totality of the offered lead. In some hot connection scenarios, lead classifying information might be provided by the consumer interacting with a human intermediary or interacting with a computer-driven voice interface system (an Interactive Voice Response Unit, i.e. 415) which, in one embodiment, asks the consumer a few questions about the product they want and about themselves. After such classification questions have been asked the underlying voice or chat technology will digitize and transfer the lead classifying data to the matching engine. The lead is classified by its classifying data to fit in an appropriate bids matching bin by the classifier (i.e., 452) and the winning bid or bids are determined (i.e. in unit 454). Then the hot connection is forwarded or otherwise delivered to the winning bidder(s) under control of the leads delivery engine. In one embodiment, such forwarding includes directing the automated call forwarding unit 416 to forward and on-hold live telephone call (cell phone or otherwise) to a winning bidder. In the same or an alternate embodiment, for leads that are not hot, the information obtained by the lead capture mechanism from the prospective consumer includes a return connection address, such as a phone number and/or an email address and the winning lead bidder uses that return connection information to try and reestablish contact (represented as switch means 119 in FIG. 1) in order to continue developing the lead. Of course, if the return connection information is not valid, the buyer may be displeased and may request return of the purchase price paid for the lead.

In step 520, received leads are validated and/or rated for acceptability by the exchange system. Such validation and/or acceptability rating (520) may include automated validation/rating 521 and manual validation/rating 523 substeps. The automated validation/rating substep 521 may triage received leads according to whether they appear to have valid contact information (clearly good), they are questionable (maybe) or they are clearly bad (they contain invalid contact information) as well as validating that the received lead descriptor data comes from registered and properly identified lead sellers. Clearly bad or invalid leads are discarded from the system (and optionally returned to the seller) in step 522. Questionable (maybe) leads are forwarded to the manual validation/rating substep 523 for further interrogation by human assessors. Bad ones of the manually checked leads are discarded from the system (and optionally returned to the seller) in step 524. Manually validated and rated-as-acceptable leads flow through path 526 into step 530 as do also the automatically validated/rated-as-acceptable leads along path 525.

The automated validation/rating algorithms of substep 521 might vary according to product market and may include probabilistic heuristic models which, in determining whether the lead is assigned to the good, bad or maybe categories (or a larger or smaller plural number of categories) take into account various factors such as the seller's quality history (as stored in a database, i.e. 457), the consumer's purchase history (as stored in a database) and other information such as address, phone, email and their associated probabilities of validity. A lead with a relatively high probability of being valid and/or a relatively high probability of converting into a close gets a relatively high acceptability rating while a lead with a relatively lower probability of being valid and/or a relatively lower probability of converting gets a relatively lower acceptability rating.

An example of a simple acceptability rating algorithm is as follows:

$$\text{Acceptability\_Rating} = a_1 * P(\text{lead is good because of origin from a known good quality seller as identified in database 457}) + a_2 * P(\text{lead will convert, i.e. because it points to repeat customer in database \& therefore likely to close again, even if other information is negative for acceptability}) - a_3 * P(\text{phone\# given is wrong, i.e. because not in database}) - a_4 * P(\text{other contact information is wrong, i.e. because not in database}) - a_5 * P(\text{lead is a fraud, i.e. because consumer not real and/or other fraud-indicating factor}) + a_6 * P(\text{other acceptability enhancing factor is true}) + a_7 * P(\text{other acceptability reducing factor is true}) + / - \ldots$$

where in the given acceptability rating algorithm, P(A) is the probability that proposition A is true and weighting coefficients $a_1$, $a_2$, etc. are empirically chosen to indicate the importance assigned to the corresponding proposition A in accordance with product market and/or other considerations. A predefined discriminating algorithm (set thresholds) then determines whether to discard the rated lead as being bad (522) if its acceptability rating is below a predefined threshold, or whether to send it to the maybe bin 523 or to the good path 525 per further thresholds.

In step 530, validated/well-rated leads are stored and dynamically classified against active bid profiles within the system. Connection 535 represents such dynamic matching of available leads against available (active) bid profiles. Step 540 constitutes the finding of the matching bid profiles from among activated profiles 547. (Deactivated bids are removed via path 548 from participation in the matching process 540.)

In respective steps 541 and 542, the highest-bidding and matching one of the exclusive bids is found and the highest-bidding and matching subset of N nonexclusive (shared) bids is found. In one embodiment, N=4. Other values greater than one are possible and can vary according to product type, geography or other factors.

In step 543, the revenue maximizing one of the finds from steps 541 and 542 is picked. This maximizes the revenue that the seller can receive for his offered lead. In one embodiment, the sellers and buyers may agree to have multiple rounds of auctioning. Those bids that did not win may be given an option to escalate their bids without knowing what the winning amount was. Step 544 determines whether such multiple bidding rounds are allowed. Step 546 triggers losing bid profiles into revealing their escalated bids. (Buyers of course must specify such escalated bids, and if they want to engage at all in escalateable bidding battles.) In one embodiment, each bidder specifies his or her maximum bid to the system, and if the given bidder wins (becomes a buyer) the system discounts the provided maximum bid amount to a little above (i.e., 10 cents above) the next highest bid in the bid bin. This way each bidder only needs to specify the maximum they are willing to pay and the bidder can rest assured that they will not pay much more than they had to win the bidding contest. In an alternate bids processing system, a probabilistic random model is used to determine who the winner is such that the highest bidder or bidder group has the highest probability (less than 100%) of getting the lead, but the next highest bidder below might get a few of the leads even though the next highest bidder is not at the top of the bidding heap in that particular bidding round. The reason for using this probabilistic awarding method is that it is beneficial sometimes to keep bidders "engaged" in the marketplace by letting them win occasionally. If the system has a pure winner always takes all type, some bidders might disengage from the bidding wars, which action would not benefit the competitive nature of the model by encouraging many bidders to participate in the system.

Eventually, the optional step 544 passes an identification of the winning bidder or winning bidder group along path 454 to node 550. Path 531 carries the won lead out of the pool of leads held in node 530. Path 532 carries stale leads (leads whose respective ages exceed system defined thresholds) out of the pool of leads held in node 530. Further within flow node 550, delivery of the won lead to the winning bidder or bidders is scheduled. In one implementation leads are never stored in the system more than about 250 milliseconds. They are sold off to the highest bidder(s) almost immediately upon entering the system. In such a case there will not be any "aged" leads in such a system.

In step 558, the winning bid price is optionally adjusted (e.g., discounted) in accordance with a quality feedback factor or function developed for the seller of the won lead. In subsequent steps 561 and 562, system-controlled accounts of the buyer and seller are respectively debited and credited.

In one embodiment of step 558 the exchange system (e.g., 200, 400) maintains a historical database of the seller's past performance over a recent time period of predetermined length and penalizes the seller to some extent if the seller exhibited poor lead quality in that time period. One algorithm for evaluating a given seller's past performance normalizes the given seller's closure rate (the percentage of leads that culminated in closed deals during the evaluation period) against the average closure rate of a top X % by volume of a representative sampled subset of all sellers using the system and engaged in that product line, where X % is a predetermined factor such as 5%, 10%, or 25%. The system however rewards the seller if the current lead exhibits characteristics that make the one lead better than average leads offered by the seller. For example, in one embodiment of step 558 the exchange system (e.g., 200, 400) maintains a historical database of known customer past performances over a recent time period of predetermined length and rewards the seller to some extent if the current lead points to a prospective consumer of known good consuming activity in the predefined time period. Conversely, the system can penalize a generally good seller if the consumer to which the current lead points has known bad consuming activities in the predefined time period. A generalized algorithm for price adjustment at step 558 may take on the following form:

$$\text{Price Discount rate} = a*\text{SellerAccountDiscountRate} + b*\text{CurrentLeadDiscountRate}$$

where a and b are predetermined weighting coefficients for the given product line, where Seller_Account_Discount_Rate is a variable that can be positive or negative and is based on historic data such as closing rate of this seller's account versus accounts of the best known lead sources, and where Current_Lead_Discount_Rate is a variable that can be positive or negative and is based on of specifics of the offered lead such as for example, reducing the Price Discount Rate to as low as 0% due to the fact that the pointed-to customer is a repeat customer who recently bought a different product and is therefore highly likely to buy the current product. One the other hand, for some products, if the pointed-to customer is a repeat customer who recently bought the same product, that might be a factor that penalizes the seller by increasing the Price Discount Rate. The algorithm can have many more weighted variables and the operations of each may vary from product line to product line as well as between different classes of leads (high quality leads versus lower band ones).

Referring to FIG. 6, a sample seller's performance feedback structure 650 is shown in the form of being part of an on-screen GUI display (Graphical User Interface display). The GUI display 605 may be generated on a computer monitor or another form of visual-generating interface 602. The user may employ a mouse-driven cursor and/or a data entry keypad (not shown) for interfacing with the GUI display 605. Partial frame 601 represents the computer system (or other automated machine means) which operatively interfaces with GUI display 605. Item 600 represents the full operative system including automated machine means 601, display means 602, GUI means 605 and a network interface means (not explicitly shown) which allows the user (e.g., a seller of leads that point to prospective consumers of home refinance services).

A first menu bar 610 within GUI 605 includes an identification of the seller (the user) and/or his/her account, an indication. The first menu bar 610 may further include a help invoking button and a log-out invoking button (not shown).

A subsidiary menu bar 620 within GUI 605 includes pop-out menu headers denoted as "Home", "Lead Accounts", "Reports" and "Account Settings" among others. The Reports menu header is highlighted in the example to indicate it has been selected by the user. A third menu bar 630 with continued highlighting from the highlighted Reports item in bar 620 allows the user to pop out further functions relating to online generated reports or scheduled report generators. In the illustrated example, the user has already requested a generated current report for his seller's account number AID 967 and for those of his lead offerings that were processed by the exchange system (e.g., 400) between Jun. 11, 2005 and Aug. 11, 2005. Generally, sellers will establish separate accounts for different kinds of products since each has its own nuances. In this example, the lead seller's account AID 967 is directed to the offering of leads to vendors who are engaged in providing loans for home owners in the form of, for example, Refinance packages, Home Equity loans and loans for purchase of new homes. This can be seen in the Products column of generated report section 640.

Rather than picking "Reports" on bar 620, if the user had instead selected the "Account Settings" menu, a set of other options would have been displayed in continuation area 630 related to managing the various seller accounts that the logged-on seller has established within the leads-and-bids exchange system (e.g., 400). The "Resource Center" option provides user help.

GUI region 640 represents a dynamically sortable listing of activities for various sub-accounts identified by ILI-ID numbers (inbound lead integration identifiers). The up/down triangles are clicked on by the user to sort the list in ascending or descending order using the clicked-in column as the sorting key. Sub-accounts 269 and 249 both deal with leads directed to the Refinance business. Sub-account 269 might use a first kind of lead capture mechanism (e.g., Internet portal 411 of FIG. 4A) while sub-account 249 might use a second kind of lead capture mechanism (e.g., IVR 415) for generating respective leads. The user can see from the listing 640 how well each sub-account is performing relative to others in the specified report period (e.g., Jun. 11, 2005-Aug. 11, 2005). The Date column indicates the last activity date for the sub-account. The Valid column indicates how many of the sub-account's offered leads were validated or rated as acceptable by the exchange system and not bounced back as invalid. The Sold column indicates how many of the sub-account's offered, and already validated, and not-yet-returned leads were sold via the exchange system. (In other words, the Sold column is a subset of the Valid column in area 640.) The Unmatched column indicates how many of the sub-account's offered leads failed to find any matching bid profiles. The Invalid column indicates how many of the sub-account's purchased leads were either bounced back by the system as invalid on their face (prima facie invalidity) or returned by buyers with a complaint that the bought lead was found to be invalid when development work began on the lead (i.e., the lead was found to have bad contact information in it, i.e. a wrong telephone number, making it unusable). The Duplicate column indicates how many of the sub-account's offered leads were either returned by the exchange system because the system found a duplicate copy of the same lead to have been already offered and/or sold; or returned by a buyer because the buyer discovered that the purchased lead was a duplicate of an earlier lead purchased by the same buyer. The Queued column indicates how many of the sub-account's offered leads are queued up as not-yet-accepted "maybe's" in manual validation bin 523 of FIG. 5. This information is provided in essentially real time so that the seller may take corrective action if, for example, there are too many queued leads on a report line that has today's Date in it. The seller may responsively call the exchange operator to find out why an excessive number of his submitted leads are being bounced into the "maybe" hopper 523. Such bouncing into the maybe hopper 523 is particularly detrimental to "hot" leads because the on-hold prospective consumer may hang up before the system operator completes manual validation of the lead. It is in the lead seller's interest to minimize the number of his leads that get routed into the "maybe" hopper 523.

Before going live and online within the system, sellers may test their interfaces with so-called test leads. In one embodiment, each lead data structure includes a test-lead indicator for indicating that it is a test lead rather than a live lead (or a live lead indicator which indicates the vise versa case). Test leads are not routed by the system (e.g., 400) for bidding against by in-system profiles within box 452 for example. By contrast, offered leads do flow into box 452 after validation. Instead test leads are filtered out of the flow after having run through the validation and/or acceptance rating box 451 (e.g., steps 520-524 in FIG. 5). The Test column in region 640 of FIG. 6 indicates how many of the sub-account's leads were routed through the exchange system for automated and/or manually testing for quality assurance purposes only. The Test Invalid column indicates how many of the sub-account's test-only leads were deemed to be invalid the exchange system. Such an automated test and show-invalid system operates in essentially real time in one embodiment, and allows sellers to confidently integrate new ones of their lead sourcing mechanisms (e.g., 411-415, 417) with the system before going forward with live bidding on such leads. It is within the contemplation of the disclosure to provide other flow control indicators within inbound leads beyond just those requesting a validate-and-ignore treatment. For example, a seller may wish to find out if his leads match up with existing bid profiles while not yet submitting those leads for live bidding. In one embodiment, each lead data structure includes a match-but-don't-sell indicator for indicating that it is a match-testing lead only rather than a live lead. In-lead indicators may of course also request both validation and match verification or other combinations of non-binding interactions with the system (i.e. a hypothetical test of estimated revenue streaming without actually selling the leads). In one embodiment, each lead data structure includes custom lead-tracking indicator which triggers a report back to an authorized seller of where his offered and/or sold lead currently resides within the system and what it's state is (i.e., is a reputable buyer now busy converting the sold lead into a deal closure?). There are instances where sellers want to assure that the consumers found by the sellers are being promptly and properly serviced by the exchange system and by the winning buyer at the other end. Such custom tracking flags allow them to monitor what is happening with specific ones of their leads.

Just as sellers can run dummy leads into the system for test purposes, in one embodiment, buyers may similarly test the operational integrity of the lead delivery engine (455) by asking the system to feed the buyers with one or more dummy leads (ones which the buyers do not pay for and which have dummy lead information provided in them). If the requested dummy leads correspondingly show up on the buyer's interface device (480) within a specified time period, the buyers can conclude that the delivery engine (455) and their interface device (480) are working properly and at the desired delivery speed. Thus, the system provides integrity verification for sellers and buyers to help them assure that their respective interface devices are still operatively interconnected to the exchange system.

The revenues column of FIG. 6 indicates how much actual money (or other value) the exchange system 400 (or 200) is awarding the seller for the corresponding sub-account over the specified report period (e.g., Jun. 11, 2005-Aug. 11, 2005). In one embodiment, if the seller is testing for hypothesized revenue flow rather than real revenue, an indicator would flash to clearly indicate that the revenue figure is hypothesized one rather than a real one. The Totals row provides a totalized summary for the user. Totalized revenue is only for actual revenue, not hypothesized revenue from dummy test leads. In the illustrated example, some of the report rows were left out. Thus the totals do not always match what is shown above them.

GUI region 650 presents the user with quality feedback information to let the user know how his or her leads (in different lead accounts) were rated by the exchange system. A relatively low, Lead Quality rating means the seller's leads are being heavily discounted or marked down. A relatively high invalid rate means that a large fractional portion of the offered leads are being rejected by the exchange system as being invalid or rated as being unacceptable. The seller may adjust his or her methods of originating and/or capturing leads so as to increase quality rating and/or decrease the reported invalid rate, thereby increasing the seller's revenue and providing the lead-buying community with a better flow of valid and/or higher quality leads. It is win-win for sellers and buyers of leads.

Other aspects of leads-and-bids exchange systems in accordance with the invention may include allowing Buyers and Sellers to choose from lists of products they desire to exchange. In one embodiment, Buyers do not analyze and purchase leads on a one-at-a-time basis, but instead purchase leads in bulk based on buying criteria. Buyers can set daily budgets on lead purchases in the form of dollars spent and/or number of leads purchased. In one embodiment, the winning bid is reduced to a predefined offset (say, $0.10) above the second highest bid to determine the final winning bid price of the lead prior to any seller quality discount. Such an offset mechanism assures new bidders that they will not substantially overbid above more experienced bidders. In one embodiment, Sellers are required to send their leads in real time immediately after origination so as to minimize lead aging. Buyers may elect to receive leads in real time or as parts of batch files. Supported transfer methods include email, HTTP/S and FTP.

In one embodiment, a minimum 7-day settlement cooling-off period is enforced prior to releasing system-accumulated seller funds to respective sellers. During this cooling-off period, disputes between sellers and buyers are analyzed by system administrators and returns are issued if necessary at the discretion of the system administrators. Sellers and the leads themselves may be subject to constant quality review by the system administrators so as to improve the quality of leads stored in offer pool 530 (FIG. 5). The system administrators may adjust prices paid for leads based on various proprietary performance pricing algorithms created by the system administrators in order to attempt to satisfy quality demands of major lead buyers within the extant market. In one embodiment, system administrators require buyers to ensure that all prospective consumers will be contacted within a specified period. In one embodiment, system administrators automatically send emails to lead-filling prospective consumers confirming receipt of their request for product or service under the SecureRights advocacy brand. In one embodiment, sellers are required to follow all government regulations for consumer privacy guidelines. In one embodiment, the confirmation email allows the prospective consumer to indicate directly in the email if they are no longer interested in the product or service, or if the consumer never initiated or authorized the contact—thus indicating a bogus lead, or that they want to be contacted at an indicated later time and that information can be automatically processed by the system so as to not bother disinterested consumers with immediate call backs or other such contact. System will also help detect fraudulent leads where the consumer never initiated requests or authorized for buyers to contact them.

The disclosed leads-and-bids exchange systems are examples of automated global data exchange platforms which allow for negotiated exchanges of commodity-like items such as leads by buyers and sellers in an open market style of environment. The automated platform allows buyers to specify the items (e.g., leads) they desire. The automated platform allows buyers and sellers to increase their respective profits and efficiencies by flowing offered items (leads) to the largest interested buying pool (matching bid profiles) present. The system assures to a high probability that the highest bidding buyer will have his demands fulfilled (but not always, thus giving lower bidders some success in engaging with the system and not otherwise encouraging them to leave due to constant disappointment). A successful automated market can be maintained by assuring the integrity of the data exchanged between buyers and sellers and by assuring the presence of a viable population of buyers and sellers for the items defined by the system-exchanged data. The disclosed platform includes protective measures for ensuring quality and accuracy of data (i.e., lead validation, verified identification of the sellers and of the buyers) so that fraud is minimized if not all together prevented.

On the item-sourcing end of the model, (i.e. the lead originators), users register online (primarily online, with possible manual telephone aid from system administrators) and the item-sourcers integrate with the engine by first running dummy test one of offered items (i.e. leads) to assure that data flow is operative and system acceptance of the dummy test one of offered items is functional. Then, the item-sourcers stream their live items into marketplace implemented on the system for actual binding negotiation with item buyers. On the other end of the system, item-purchasers (i.e. lead buyers), similarly register with the system and test interoperability with use of dummy items (dummy test leads) before entering into live and binding bidding or auctioning. Automation of the system allows buyers to receive highly qualified purchase items (e.g., bid-classified leads) with a relatively low (i.e. fixed) transaction cost.

The automatically-implemented marketplace disclosed herein allows bid-matching ones of the sourced-items (i.e., validated and classified leads) to be variably priced in accordance with buyer bid specifications and seller's historical performance of earlier offered items (earlier sold leads) normalized relative to volume. The automatically-implemented market is supported by appropriate data security and data delivery applications.

One embodiment is termed as an Equalized Price-Paid Exchange Model because paid price is equalized or adjusted to compensate for past good or bad performance. In the leads exchange version of this model, buyers bid for qualified and targeted lead data on a pay-per-lead basis. Sellers operate an online marketplace that hosts data collectors which provide or navigate to template web pages and encourage prospective consumer to use the templates as a means for collecting consumer information and then transferring the filled-in templates as actual lead data for matching against bids of buyers who specify a desire for such actual lead data. The winning buyers can have the lead data delivered directly into their respective lead management applications so that buyer agents can work the telephones and continue to develop a hot or other lead while seeing the relevant lead data presented on the agent's screen via the respective lead management application. Data transfer and financial exchange can be automatically managed by the operator of the sourced-items and bids exchanging platform (i.e. the leads-and-bids exchange system) thereby freeing buyers and sellers to focus on their primary business objectives without having to worry about the details of each negotiated exchange.

In one data exchange process in accordance with the invention, the exchange-system operator allows sellers (item-sourcers) to either "grab" a predefined template form from the exchange system for hosting on the seller's website or to frame a customized form and have that customized form hosted on a website operated by the exchange-system operator. Data relating to a prospective consumer is then captured from the hosted form and automatically transmitted to the exchange platform where the captured data is treated as a lead that is to be exclusively or non-exclusively matched with up to four buyers. Won lead data is then passed to each successful buyer per delivery specifications as pre-set in the buyers' administrative application (buyer's account). Buyers can provide performance feedback regarding purchased leads back through an automated feedback loop or into a lead management ledger that is periodically scanned by the system for quality assurance purposes.

During the financial exchange process, leads (or other sourced-items) are variably priced as a function of seller segmented performance (historical performance and current lead attributes) as well as by the magnitude of current buyer bids. Credits for purchase and sale price per lead are passed almost instantaneously to buyers and sellers upon lead delivery.

In the leads exchange environment, the desires of at least three different kinds of participants should be satisfied in order to maintain a viable, automated marketplace: consumers, lead sellers and lead buyers. First the experience is reviewed from the perspective of the product consumer who is trying to be connected to a vendor of a given product:

Process for Consumer:

In a first step (consumer.1), the consumer fills out a template or form that is hosted on the seller's website. Alternatively, the consumer provides information about himself and his desires to customer service representative working for the lead-sourcing and lead selling company. The customer service representative then enters the information into a digitized form or template. The contents of the to-be-filled-in forms or templates may vary on a product by product basis. In general, the forms should include both product-specific information indicating the product or class of products desired by the prospective consumer and basic contact-information for re-contacting the consumer.

In a second step (consumer.2), the form-captured data is quickly transferred from the seller capture device to the leads-and-bids exchange system where it is segmented based on the collected data (e.g., segmentation may be based on any one or more of information collected from the consumer and respectively indicating state, zip, area code, self selected credit, or product specific data such as loan amount, debt amount, house value). The segmented lead data is then matched with the highest exclusive bid or collection of shared bids as specified by a corresponding one or more buyers (e.g., up to four). The consumer will be on hold on the telephone line or on another hot connection at this time and will not be aware this is going on.

In a third step (consumer.3), the lead data is then quickly transferred to the buyer and in some instances, the information about the buyer is quickly transferred back to the seller's interface end and/or is presented to the consumer (who has been momentarily on hold) so that the lead-seller and/or prospective consumer will know who is going to be further managing the process (which lead buyer) from this state going forward.

In a fourth step (consumer.4), the lead buyer continues contact with the consumer (or re-establishes contact) and attempts to close a sale. In the hot contact scenario, because steps 2-3 happened so quickly, the prospective consumer is essentially unaware that his or her information was bid on and purchased by a relatively highest motivated one of competing buyers.

Next, experience with the system is reviewed from the perspective of the lead buyer who is trying to acquire a connection with a prospective consumer of a given product:

Process for Buyers:

In a first step (buyer.1), the lead buyer signs-up or otherwise registers and obtains a buyer's account through a self-serve automated registration process. During this process, the buyer creates one or more buyer accounts, deposits funds via credit card or otherwise for use in the purchase of leads, selects a desired delivery frequency, specifies a format and method for delivery of leads (i.e. into his leads management application), selects desired data security protocols, selects one or more products that are to be vended via that buyer, specifies one or more bids on a per product basis and sets up a quality feedback loop mechanism by way of which the buyer can indicate his or her satisfaction with leads purchased through the system.

In a second step (buyer.2), lead delivery capability is tested with dummy leads, and once confirmed as successful, the buyer's bids may go live.

In a third step (buyer.3), every time a lead from a given seller hits the system and is validated by the system, the matching buyer bid profiles are seeded into a competitive bin by a segmentation process and these compete against one another subject to their specified allowable daily volumes and daily spend limits.

In a fourth step (buyer.4), won leads are then delivered per the lead delivery specifications of the winning buyer and they are also logged into the exchange system ledger (quality database) for subsequent analysis if any.

In a fifth step (buyer.5), buyers are encouraged to provide quality feedback information regarding the leads they purchased, indicating for example whether the respective lead closed successfully, whether the lead was found to be invalid or a dead lead.

In a sixth step (buyer.6), feedback information accumulated from multiple buyers and respecting a given seller; is used as a factor in determining the historical performance of leads offered by that seller (or seller account) and the historical performance then becomes a component in later determining the adjusted bid pricing for future leads offered by the given seller.

In a seventh step (buyer.7), after having transacted on the system, the buyer can generate customized reports regarding results and can analyze the data in order to optimize his or her future bids based on performance of the leads that were already purchased through the system. This bid-profile optimization process can be an iteratively carried out one that allows the buyer to constantly augment his bids based on current market conditions.

Next, experience with the system is reviewed from the perspective of the lead seller who is trying to maximize revenue for his or her lead generating activities:

Process for Sellers:

In a first step (seller.1), the lead originator (or other-item originator) sign ups or otherwise registers with the system via for example, an internet connection and by using a self serve automated registration process. During this process the originator creates one or more main accounts for himself and/or subaccounts (e.g., the subaccounts each being associated with a specific lead origination mechanism) where the establishment of the main or subaccounts includes a specification for electronic funds transfer processes to be used in automatically paying the originator for items sold through the items-and-bids exchange system. Once the appropriate main and/or subaccounts have been established the originator chooses which items (e.g., which leads for which products) they would like to offer for bidding upon within the items-and-bids exchange system.

In a second step (seller.2), the lead originator (or other-item originator) chooses one or more of plural integration formats that are to be used for each product, where the chosen integration format(s) each includes an indication or specification of how an offer to engage in a transaction will be presented a corresponding customer base (e.g., consumers of home refinance services). The selectable integration formats may include those where the operator of the items-and-bids exchange system hosts a consumer interface form and those where the item originator (leads seller) hosts his or her own consumer interface forms, presented under an appropriately executing hosting application. Should the originator elect to use the operator's forms, the originator is presented with a plurality of customizable templates from which to choose. After the integration formats are chosen and established, interoperability between the hosted forms and the items-and-bids exchange system is verified by streaming dummy test leads (or other data describing an item-for-sale) from the host site(s) to the exchange system to ensure functionality prior to going live.

In a third step (seller.3), the lead originator (or other-item originator) activates the hosting of live (nondummy) forms on his or her website(s) and/or via an intranet for customer service representatives to use in entering data into that specifies the items for sale (e.g., the leads being offered for bidding upon).

In a fourth step (seller.4), consumers found by the lead originator complete the hosted forms and their data is transferred to the leads-and-bids exchange system as live leads to be bid on.

In a fifth step (seller.5), upon receipt of the lead data, and validation of the received data, the leads-and-bids exchange system matches the lead with top seeded bids that indicate a desire for such a lead, and the system returns buyer-identifying data for presentation to the consumer (so the consumer knows who they are dealing with) and the system returns credit as a revenue per lead amount to the seller's account. At times the seller may include custom tracking data along with the lead data when sending the lead data to the leads-and-bids exchange system. Upon successful sale of the lead, the custom tracking data is immediately returned to the seller along with the data previously mentioned herein. Thus the seller can easily determine that a specific lead was sold and how long it took for that lead to sell through the leads-and-bids exchange system. Lead pricing is augmented via the lead pricing process which takes into account the historical quality of the seller's previous leads and the seller's volume of leads being sent to the leads-and-bids exchange system, as well as optional per-lead attributes that may warrant enhanced or discounted pricing.

In a sixth step (seller.6), upon receipt of the lead pricing data and/or lead-quality rating data (e.g., invalidity rate, conversion rate, etc.) the lead originator can work on improving the format and/or content of their lead generating forms on an ongoing basis so as to try to increase conversion rates and thus increase the revenue stream that flows back to them via the leads-and-bids exchange system. The operator of the leads-and-bids exchange system may similarly work on constantly updating its operator-hosted templates or forms in order to find those that provide higher lead conversion rates; this working to increase buyer and seller satisfaction and to thereby increase market volume and fees paid to the operator on a per transaction basis. Since the quality of the consumer-directing forms is being constantly improved, the buyer can also realize higher conversion rates in its direct marketing efforts.

Next, the system pricing mechanism is reviewed from the perspective of those involved:

Pricing Equalization Process

In one embodiment, the pricing equalization process normalizes the cost-per-lead based on the performance of segmented leads on a per-seller basis. This process prices leads based on volume and performance of segmented leads exchanged resulting in a fixed acquisition cost for buyers and optimal revenue for originators. The process sets a performance baseline by originator, then varies pricing by providing maximal reward for a prespecified percentage of the top performing originators and reduced or discounted pay back for originators who perform below that benchmark.

The disclosed items-and-bids exchange system allows for the creation of operational efficiencies for buyers and sellers (and also for prospective consumers in the case where leads are the offered item) through the use of automated technology. In one embodiment, the process is fully automated from user sign-up, to data flow integration and to ongoing management of quality and validity of data exchanged between buyers and sellers. The model of matching bid profiles with segmented and qualified leads allows buyers to purchase highly, qualified and targeted leads (leads satisfying the buyer's profiled specifications). Such a model generally (not always) yields the highest bid-per-lead. In one embodiment, the items-and-bids exchange system securely transfers offer and bid related data via appropriately encrypted channels to and from internal systems of the respective buyers and sellers so that such users have assurance (to the extent the secured channels allow) that their proprietary data is unlikely to be compromised.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

By way of a first example of a variation, although buyer and/or seller interfaces are shown as GUI's in FIGS. 3 and 6—which in one embodiment, provide feedback to users essentially in real time (e.g., within about 250 to 500 milliseconds or less of transaction completion within the system), other forms of messaging are within the contemplation of the invention, including but not limited to signaling via voice commands or artificial voice generation, and using webservices calls.

By way of a second example of a variation, it is understood that the configuring of any or all of a seller's interface device 410, buyer's interface device 480, and parts or all of the exchange core 450 (FIG. 4A) in accordance with the disclosure can include use of one or more computers to carry out selective activation of one or more functions described herein. A computer-readable medium (e.g., optical disc) or another form of a software product or machine-instructing means (including but not limited to, a hard disk, a compact disk, a flash memory stick, a downloading of manufactured instructing signals over a network (e.g., 420) and/or like software products) may be used for instructing an instructable machine to carry out such activation. As such, it is within the scope of the disclosure to have an instructable machine carry out, and/to provide a software product adapted for causing an instructable machine to carry out machine-implemented methods per the descriptions provided herein.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer display screens, GUI organizations, computer program listings or art works or other works provided herein, and to trademark or trade dress rights that may be associated with coined terms or works of authorship provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A computer-implemented method, comprising:
  receiving, by at least one computer, selectively activateable bid profiles from corresponding lead buyers, wherein each bid profile includes specifications for desired leads and a bid, the specifications for each bid profile including one or more lead seller-specific attributes selected from the group consisting of: a lead seller's general leads quality history as defined across predefined conversion probability bands measured over a predefined time period; a lead seller's general leads quality history as defined by a number of defective leads as measured over a predefined time period; a quality of prospective consumer associated with a lead seller's leads as measured over a predefined time period; a lead seller's general leads quality history as defined by conversion rate over a predefined time period; a lead seller's general leads quality history as defined by connection to interested although non-converting potential customers; and a lead seller's general leads quality history as defined by staleness or freshness of leads associated with the lead seller;
  storing the received bid profiles in a storage memory associated with the at least one computer;
  receiving, at the at least one computer, a live lead from a lead seller, wherein the live lead includes lead data corresponding to the live lead and wherein the live lead is associated with a telecommunication link with a waiting human caller;
  comparing, using the at least one computer, a set of activated bid profiles to the lead data to select matching ones of the activated bid profiles according to their bid profile specifications, the set of activated bid profiles comprising two or more of the received selectively activeatable bid profiles;
  determining, using the at least one computer, a winning bid profile and a corresponding high bid from the selected matching bid profiles;
  coupling, using the at least one computer, the lead buyer corresponding to the winning bid profile to the waiting human caller over the telecommunication link to establish a telephone call; and
  determining, using the at least one computer, a price to be paid by the lead buyer for the establishment of the telephone call based at least on the high bid.

2. The method of claim 1, further comprising:
  enabling lead buyers to selectively activate and deactivate parts of or their entire bid profile specifications.

3. The method of claim 1, further comprising:
  enabling lead buyers to selectively limit a total number of leads won over the course of a predetermined time period.

4. The method of claim 1, further comprising:
  enabling lead buyers to specify in their bid profile specifications one or more of: a product, product type or range of products for which leads are sought by the corresponding bid descriptor, where product can be one or more of goods or services.

5. The method of claim 1, further comprising: adjusting the high bid based upon feedback regarding the lead seller.

6. The method of claim 1, wherein the at least one computer comprises a plurality of computers.

* * * * *